US006952267B2

(12) United States Patent
Rarac

(10) Patent No.: US 6,952,267 B2
(45) Date of Patent: Oct. 4, 2005

(54) METHOD AND APPARATUS FOR MEASURING BANDWIDTH OF A LASER OUTPUT

(75) Inventor: Robert J. Rarac, Carlsbad, CA (US)

(73) Assignee: Cymer, Inc., San Diego, CA (US)

( * ) Notice: Subject to any disclaimer, the term of this patent is extended or adjusted under 35 U.S.C. 154(b) by 107 days.

(21) Appl. No.: 10/615,321

(22) Filed: Jul. 7, 2003

(65) Prior Publication Data

US 2005/0007600 A1 Jan. 13, 2005

(51) Int. Cl.$^7$ ............................................... G01B 9/02
(52) U.S. Cl. ........................................ 356/454; 356/519
(58) Field of Search .............................. 356/454, 519; 372/32

(56) References Cited

U.S. PATENT DOCUMENTS

| | | | | |
|---|---|---|---|---|
| 5,970,076 A | * | 10/1999 | Hamada | 372/20 |
| 6,317,448 B1 | * | 11/2001 | Das et al. | 372/32 |
| 6,580,517 B2 | * | 6/2003 | Lokai et al. | 356/519 |

* cited by examiner

*Primary Examiner*—Samuel A. Turner
(74) *Attorney, Agent, or Firm*—William C. Cray; Cymer, Inc.

(57) ABSTRACT

A method and apparatus for measuring bandwidth of light emitted from a laser which may comprise: first and second wavelength sensitive optical bandwidth detectors providing, respectively, an output representative of a first parameter indicative of the bandwidth of the emitted light as measured respectively by the first and second bandwidth detectors, and an actual bandwidth calculation apparatus adapted to utilize these two outputs as part of a multivariable linear equation employing predetermined calibration variables specific to either the first or the second bandwidth detector, to calculate a first actual bandwidth parameter or a second actual bandwidth parameter. The first actual bandwidth parameter may be a spectrum full width at some percent of the maximum ("FWXM"), and the second actual bandwidth parameter may be a portion containing some percentage of the energy ("EX"). The first and second bandwidth detectors may an etalon and the outputs may be representative of a fringe width of a fringe of an optical output of the respective etalon at FWXM. The precomputed calibration variables may be derived from respective three dimensional plots representing, respectively, detector outputs in relation to a calibrating input light with known values of the first and second actual bandwidth parameters.

180 Claims, 8 Drawing Sheets

(5 of 8 Drawing Sheet(s) Filed in Color)

Avg Behavior of D79 (28-36)/380 kPa
Correlation gridding, WM5645 ultralow wedge etalon Data: Data2_D79
Model: 3Dplane
Equation: A*x + B*y + C
Weighting:
Z            No weighting Chi^2/DoF = 0.00008
R^2       = 0.89623

A  0.64495  ±0.0166
B  0.20797  ±0.01105
C  0.22983  ±0.00719

Data: Data5_SAM
Model: 3Dplane
Equation: A*x + B*y + C
Weighting:
Z      No weighting Chi^2/DoF = 7.8249E-6
R^2       = 0.95716

A  0.66704  ±0.00221
B  0.08951  ±0.00079
C  0.10172  ±0.00039

HiRes LAM Tracking Simulation 0.7 pm/20 pixel Bandpass

Data: Data5_HRLAM
Model: 3Dplane
Equation: A*x + B*y + C
Weighting:
Z       No weighting Chi^2/DoF = 2.0666E-6
R^2       = 0.97507
A  0.14483  ±000114
B  0.16575  ±0.00041
C  0.67263  ±0.0002

TRACKING RESIDUALS SAM + HR LAM VARIANCE = 7.3 fm

SAM: 0.12 pm FWHM bandpass
20 pixels in FWHM
800 pixel inspection range

HRLAM: 0.70 pm FWHM bandpass
20 pixels in FWHM
800 pixel inspection range 6 pilot XLA-130 lasers
4814 spectra from Bandwidth Resonance scans

METHOD AND APPARATUS FOR MEASURING BANDWIDTH OF A LASER OUTPUT

RELATED APPLICATION

This application is related to an application entitled METHOD AND APPARATUS FOR MEASURING BANDWIDTH OF AN OPTICAL OUTPUT OF A LASER assigned to the assignee of the present application and previously filed, Ser. No. 10/615,321, the disclosure of which is hereby incorporated by reference.

FIELD OF THE INVENTION

The present invention relates to the determination of the spectral bandwidth of a laser. More generally the present invention relates to the accurate estimation of the bandwidth of an optical source using interferometric or dispersive instruments ("spectrometers") whose impulse response functions have bandwidth generally comparable to or larger than that of the source being measured.

BACKGROUND OF THE INVENTION

Spectrometers based on dispersive optical elements or optical interference phenomena are well-known instruments commonly applied for the measurement of the absolute wavelength and bandwidth of light sources. When employed as a bandwidth-measuring tool ("bandwidth meter"), the effect of the finite impulse response of the spectrometer must be considered when determining the actual bandwidth of the source being measured. For the purpose of the present application, "bandwidth" may refer to any number of metrics or mathematical constructions related to the details of the optical source spectrum, such as full-width of the spectrum at half-maximum peak intensity (FWHM), full-width at some percentage "X" of the peak intensity (FWXM), width of the 95%-enclosed energy integral about the peak (I95% or E95%), etc. An accurate knowledge of the bandwidth of an optical source is very important for many scientific and industrial applications, for example in spectroscopy of liquids and gases, critical dimension control in deep-ultraviolet (DUV) semiconductor photolithography, etc.

In very simple cases, for example when the spectrum of the source and the spectrometer impulse response are accurately represented both by purely Gaussian or both by purely Lorentzian functions, the effect of the spectrometer impulse response can easily be accounted for using simple algebraic equations for many bandwidth metrics. The output spectra of most optical sources, e.g., lasers, do not have such simple forms in general and may change with time or operating condition. Further, the impulse response of the spectrometer may be similarly complex or unknown.

A common method employed to surmount these obstacles is to employ a spectrometer whose impulse response has a bandwidth so narrow in comparison to the expected bandwidth of the source to be measured that its influence is negligible. That is, the spectrometer impulse response is well-approximated by a mathematical delta-function for the case in question. However, it is not always practical or even possible to obtain a spectrometer with such a narrow-bandwidth impulse response, particularly when it is required to be very narrow in comparison to a source such as a laser which itself may be extremely narrow (tens of femtometers or less on a wavelength scale).

A second and somewhat more sophisticated method commonly used approximates the spectrometer impulse response function and the source spectrum with analytic functions (e.g., of Lorentzian, Gaussian, or mixed type) for which the effects of convolution within the spectrometer can be calculated beforehand and then expressed in simple mathematical terms. As noted above, this is not necessarily a good approximation, and can fail or become very difficult to implement dependably for certain types of bandwidth metrics. Calculation of integral bandwidth metrics such as E95% can be inaccurate or very computationally intensive using this technique.

As an illustration of second method and its shortcomings, consider a recently released product of Cymer, Inc., the owner by assignment of the present application. This product, the XLA-100, contains an onboard bandwidth meter employing a single etalon with a FWHM bandpass of about 0.12 pico-meter (pm) that is used to interrogate the output of a deep-ultraviolet excimer laser light source having an average typical FWHM bandwidth of about 0.17 pm. The above approximation is made in which both the laser and the etalon spectrometer are assumed to have an analytic Lorentzian spectral shape; therefore, the FWHM of the etalon spectrometer fringe is found mathematically to be simply the sum of the FWHMs of the laser source and the etalon spectrometer impulse response. In this Lorentzian approximation, then, the actual laser source bandwidth is estimated by the FWHM of the etalon spectrometer fringe, minus the FWHM of the etalon spectrometer impulse response (determined in independent measurements). However, because the ratio of the FWHM bandwidths of the source spectrum and impulse response function is close to unity, this method may lose accuracy in the event that the shape of the laser spectrum deviates too far from an approximately-Lorentzian shape. For example, a narrowing of the central spectral peak of the source spectrum with a concomitant increase in energy in the near wings can result in an over-estimation of the FWHM bandwidth in this approximation.

If the detailed shape of the laser spectrum is constant, the offset subtracted in this example can sometimes be adjusted to compensate. However, if the shape of the laser spectrum changes with operating conditions, with system alignment, or over the lifetime of the product, even this compensation will not remain accurate. Also at issues is the complicating possibility that in a manufacturing setting, the etalon spectrometer may be tested and offset-calibrated on one laser, but is ultimately be installed on another that has a slightly different spectral shape. In this case the calibration may be in error.

It is the purpose of this invention to mitigate these and similar measurement errors by employing more than one spectrometer operating in parallel within a single bandwidth meter, where the multiple spectrometer sub-circuits have significantly different impulse response function bandwidths. Because each sub-circuit has a different bandpass, each sub-circuit has a correspondingly different relative sensitivity to energy content in various regions of the spectrum. For example, a fringe FWHM measurement of the output of a very narrow bandpass circuit will give a result that accurately approximates the FWHM of the source spectrum, but a fringe FWHM measurement of a very wide bandpass circuit will give a result that is more closely related to the total energy content of the source spectrum. By choosing the bandwidth of the impulse response functions of the sub-circuits carefully, it is possible to mitigate the errors described above and simultaneously provide accurate estimates of integral bandwidth metrics such as the E95 width using only simple algebraic equations. A significant advantage of the invention is that these simple equations can be handled with little computational overhead, important for real-time applications such as bandwidth monitoring or sensing in high-repetition-rate pulsed lasers.

SUMMARY OF THE INVENTION

A method and apparatus for measuring bandwidth of light emitted from a source is disclosed which may comprise: first and second wavelength sensitive optical bandwidth measuring devices ("spectrometers"), these spectrometers having differing impulse response functions, and each providing, respectively, an output representative of a measured parameter related to, or containing information about the bandwidth of the source as measured respectively by the first and second spectrometers, and an actual bandwidth calculation apparatus adapted to utilize these two outputs as part of a multivariable equation or system of equations employing predetermined calibration variables specific to both the first and the second spectrometers, used to calculate an estimate of the source bandwidth according to one metric and a second estimate of the source bandwidth according to a different metric. The source bandwidth metric may be a spectrum full-width at some percentage of the maximum value attained ("FWXM"), and the second source bandwidth metric may be the width of a portion containing some percentage or fraction of the total energy ("EX"). The first and second spectrometers may be etalon spectrometers and the measured output parameters may be representative of an etalon fringe width as measured by a position-sensitive photodetector. The precomputed modeling variables and equations may be determined via an empirical measurement in which the behavior of the measured output parameters provided by the two spectrometers are compared with the values of two bandwidth metrics from a simultaneous known-accurate measurement of the actual source spectrum, which may be FWXM and EX. The response of the two spectrometers to interrogation of the known source spectrum may be mathematically modeled as dependent variables using this information, using a set of simultaneous linear equations or some other simple relation. The coefficients of the linear equations or other mathematical model may be determined by least-squares fitting of the model to the dependent variable data, in response to the independent variables provided by the known-accurate source bandwidth metrics. In the case of the simultaneous linear equation model, there will result from this procedure two equations in two unknowns that model the spectrometer measured output parameters: (first, second spectrometer output parameter)= (A,D*(calibrating source spectrum known value of FWXM))+(B,E*(calibrating source spectrum known value of EX)+C,F. The model may be inverted to estimate the bandwidth of the source spectrum: (estimate of first source bandwidth parameter)=((B*(second spectrometer output))− (E*(first spectrometer output))+CE−BF)/(BD−AE), or the equation: (estimate of second source bandwidth parameter)= ((A*(second output))−(D*(first output))+CD−AF)/(AE− BD). FWXM may be FWHM and EX may be E95. The impulse response function of the first spectrometer may be selected to be much more sensitive to FWXM than to EX and the impulse response function of the second spectrometer may be selected to be much more sensitive to EX than to FWXM.

BRIEF DESCRIPTION OF THE DRAWINGS

The application file contains at least one drawing executed in color. Copies of this patent or patent application publication with color drawing(s) will be provided by the Office upon request and payment of the necessary fee.

DETAILED DESCRIPTION OF PREFERRED EMBODIMENTS

Figure 1:
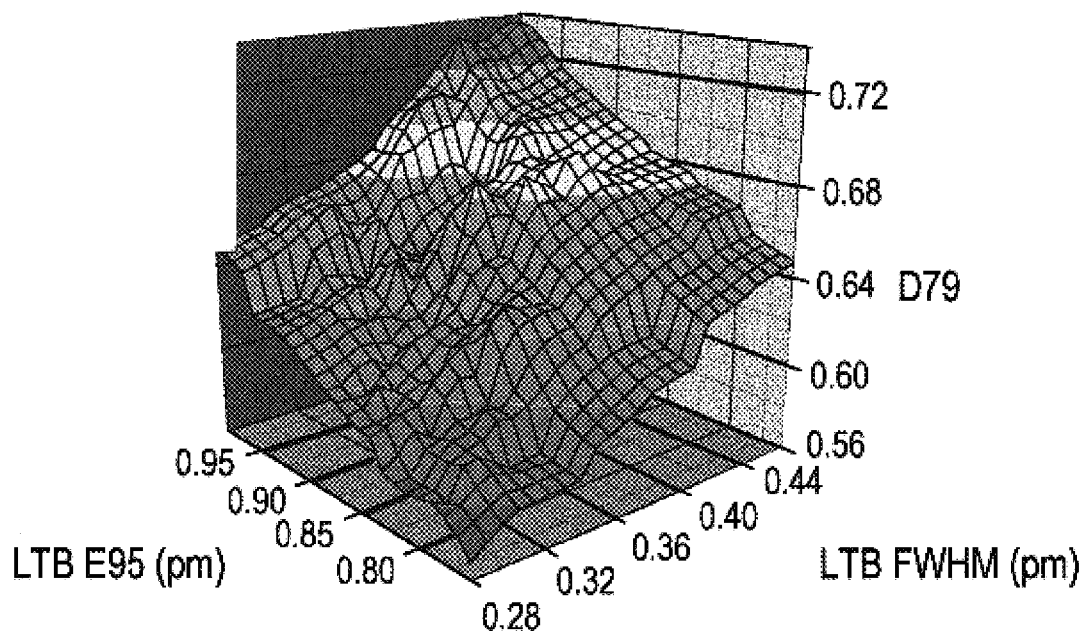
FIG. 1 shows a representative example of a three dimensional plot of the response of an etalon spectrometer of the prior art to laser light varying by known amounts in FWHM and E95, as measured by a calibrating source of laser light which is relatively adjustable in FWHM and E95.

Turning now to FIG. 1 three is shown a three-dimensional plot of the response of a bandwidth meter employing, e.g., an etalon spectrometer, e.g., an etalon manufactured by Coherent, Inc., as the values of FWHM and E95 are varied as measured utilizing a very accurate spectrometer, e.g., a grating spectrometer, e.g. ELIAS-I as manufactured by Laser Technik Berlin ("LTB").

It can bee seen that the etalon spectrometer response is comparably influenced by changes in both E95 and to FWHM of the source (a line-narrowed discharge-pumped excimer laser) over the operating range. All units are in pico-meters. A least-squares fit to a plane model of the data yields the approximation (etalon fringe width)=A*(source FWHM)+B*(source E95)+C with A=0.64495±0.0166, and B=0.20797±0.01105 and C=0.22983±0.00719. In the prior art this response has been modeled in a simpler form, in some cases where A is set identically equal to one and B is set identically equal to zero, and all of the modeling is done by adjusting the constant offset term C during calibration. In the prior art the response has also been modeled by a linear equation where the B term is set identically equal to zero so that the model takes a linear form, with the slope A and intercept C chosen to most accurately model the response as measured during the calibration process. Because the term modeling the E95 response is not entirely orthogonal to the term modeling the FWHM response, this latter method works better than that using the constant offset alone. A feature of the present invention is the ability to incorporate all three terms, which yields still better performance (but requires more than one spectrometer sub-system to fully determine the inputs to the equations).

Figure 2:
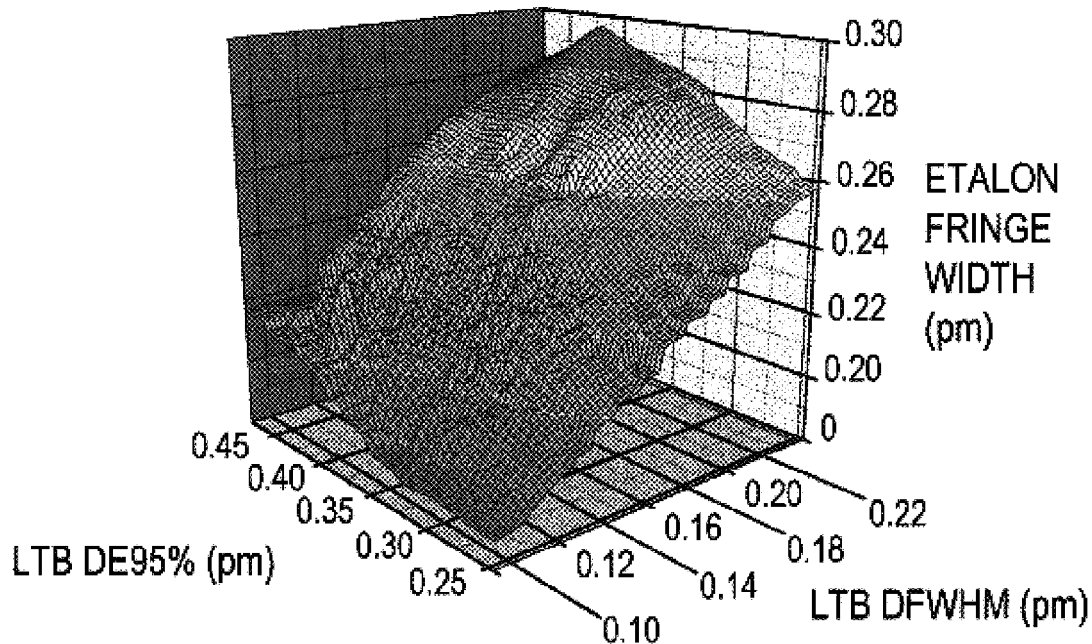
FIG. 2 shows a representative plot of the type shown in FIG. 1 for a bandwidth meter according to the present invention having, e.g., an etalon that is relatively more sensitive to change in FWHM than to change in E95.

Turning now to FIG. 2 there is shown a three dimensional plot of a simulated spectrometer, e.g., an optical bandwidth measuring device, e.g., an etalon spectrometer, which, e.g., determines the bandwidth of the input laser light by measuring the FWHM of a fringe created by the etalon projected optically onto a position-sensitive photodetector, e.g., a collection of photo-diodes arranged in a linear array (photo-diode array or "PDA"). The FWHM of the simulated spectrometer's impulse response is 0.12 pm, and the position-sensitive detector is simulated to approximate the prior art as implemented in released products of the assignee of this disclosure. The observed response indicates that the bandwidth meter is more sensitive to change in the FWHM than to a change in the E95 of the input spectrum for the spectral shape changes expected from a line-narrowed excimer laser. A least-squares fit of the data shown in FIG. 2 to the plane model results in the parameters A=0.66704±0.00221 and B=0.8951±0.00079 and C=0.10172±0.00039.

Figure 3:
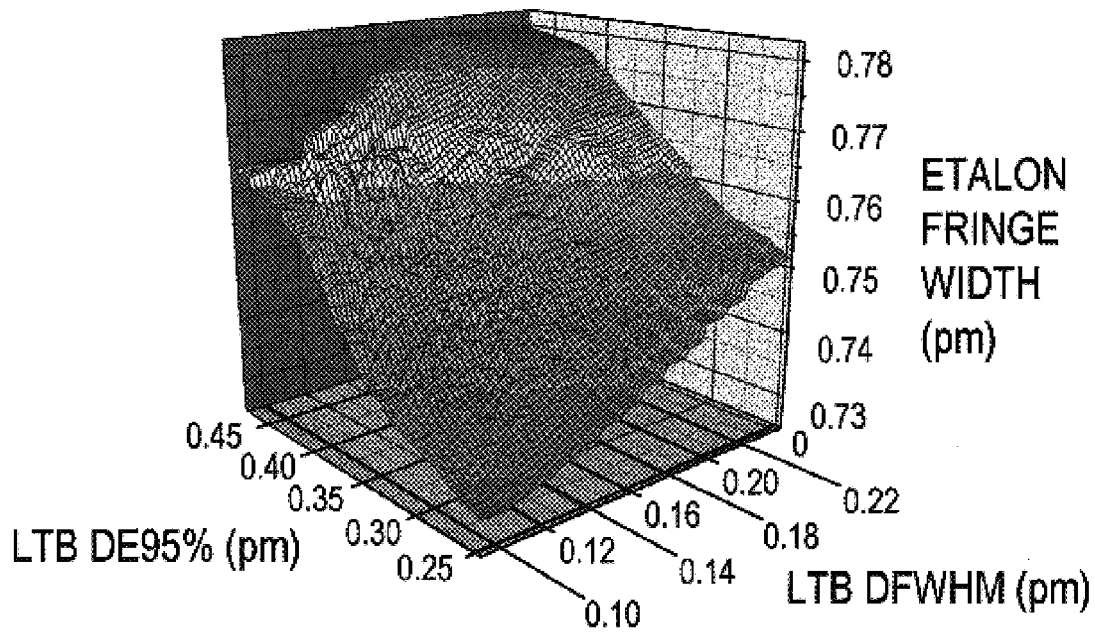
FIG. 3 shows a representative plot of the type shown in FIG. 1 for a bandwidth meter according to the present invention having, e.g., an etalon that is relatively more sensitive to change in E95 than to FWHM compared to the first.

Turning now to FIG. 3 there is shown a three dimensional plot of a second simulated spectrometer, e.g., an optical bandwidth measuring device, e.g., an etalon spectrometer, which, e.g., determines the bandwidth of the input laser light by measuring the FWHM of a fringe created by the etalon projected optically onto a position-sensitive photodetector, e.g., a collection of photo-diodes arranged in a linear array (photo-diode array or "PDA"). The FWHM of the second simulated spectrometer's impulse response is 0.70 pm, and the position-sensitive detector is also simulated to approximate the prior art. The response indicates that the bandwidth meter is relatively more sensitive to change in E95 than to FWHM, when compared to the first simulated spectrometer. A least-squares fit of the data shown in FIG. 3 to a plane model results in the parameters D=0.14483±0.00114 and E=0.16575±00041 and F=0.67263±0.0002.

Applicant has discovered that such a set of observations for each of two different bandwidth meters having differing impulse response functions, demonstrates that one spectrometer will be more sensitive to change in FWHM of the input spectrum and the other will be relatively more sensitive to change in E95 of the input spectrum. The differing impulse response can be provided by various means, e.g., by employing etalon spectrometers each having different finesse or the same finesse and different free-spectral ranges, or some combination thereof. The applicant has discovered that the spectral shape variations commonly encountered in line-narrowed discharge-pumped excimer lasers are adequately modeled by plane equations as described above; that is, modeled by two separate linear equations (one for each spectrometer) as follows:

(first output, e.g., value related to the fringe width of etalon spectrometer 1)=(A*(known actual value of the full width at some percent of the peak of the source spectrum, e.g., FWXM))+

(B*(known actual value of the width between two points about the peak of the actual source spectrum containing some percentage of the energy of the total source spectrum, e.g., EX)+ C; and (second output, e.g., value related to the fringe width of etalon spectrometer 2)=(D*(known actual value of the full width at some percent of the peak of the source spectrum, e.g., FWXM))+

(E*(known actual value of the width between two points about the peak of the source spectrum containing some percentage of the energy of the total source spectrum, e.g., EX)+F.

Given this information the bandwidth calculation apparatus can be programmed to invert the models and obtain an estimate of the source bandwidth parameters using the derived equations:

(estimate of the first source bandwidth parameter, e.g., estimate of the actual source FWXM)=((B*(second output, e.g., etalon 2 fringe width))−(E* (first output, e.g., etalon 1 fringe width))+ CE−BF)/(BD−AE), or the equation:

(estimate of the second source bandwidth parameter, e.g., estimate of the actual source EX)=((A*(second output, e.g., etalon 2 fringe width))−(D* (first output, e.g., etalon 1 fringe width))+ CD−AF)/(AE−BD).

In the more specific case where FWXM is the FWHM value of the source spectrum and EX is the E95 width of the source spectrum, and X is the width of the fringe imaged on the first etalon spectrometer PDA and X' is the width of the fringe imaged on the second etalon spectrometer PDA, then the fringe widths may be modeled by the two equations X=A*FWHM+B*E95+C and X'=D*FWHM+E*E95+F in accordance with the preceding description. Therefore, the model may be inverted to obtain the following estimates of the source bandwidth:

FWHM=(B*X'−E*X+CE−BF)/(BD−AE), and

E95=(A*X'−D*X+CD−AF)/(AE−BD).

According to this invention the two spectrometers are combined into a single bandwidth-meter, e.g., to operate in parallel, and the controller, discussed below, can be programmed to utilize the two outputs of the component spectrometers with the previously determined calibration values for each bandwidth meter, e.g., A through F, to solve for either or both of FWXM and EX. That is, full width at some percent of the maximum, e.g., FWHM or FW75% M, and/or EX, i.e., the width of the spectrum about the peak within which some percentage of the total energy is contained, e.g., E95% ("E95") or E97% or E93% etc., can be solved for by storing the respective coefficients in memory available to the processor and by providing to the processor actual outputs from the respective component spectrometers. It will be understood that if metrics other than the source FWHM and/or source E95 are to be measured and calibrated for at the factory, then such other value(s) will be the ones against which the output, e.g., etalon fringe measurement, will be modeled as discussed above to derive the model parameters, e.g., coefficients A through F above.

Figure 4:
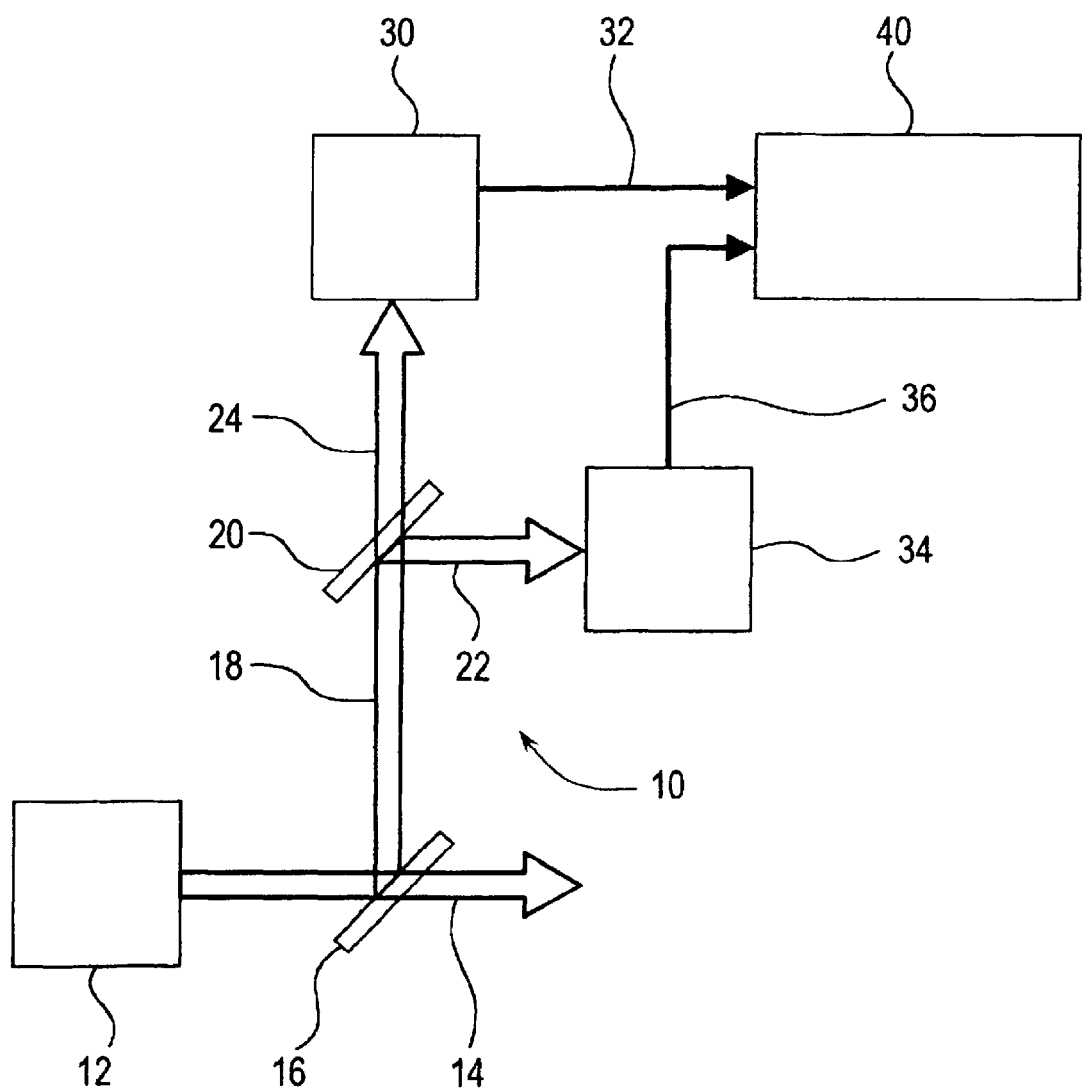
FIG. 4, there is shown a schematic block diagram of a bandwidth meter 10 according go an embodiment of the present invention.

Turning now to FIG. 4, there is shown a schematic block diagram of a bandwidth meter 10 according go an embodiment of the present invention. The bandwidth meter 10 may be set up to measure the bandwidth of a light beam 14 produced by a source such as a laser, e.g., a discharge-pumped line-narrowed excimer laser, or excimer laser plus power amplifier or power oscillator. The output of the source may be split, e.g., in a beam splitter 16 which can be set to pass most of the beam 14 and reflect a small portion in beam 18 which can pass through a second beam splitter 20 which may be set to reflect and pass essentially identical amounts of the beam 18 in a reflected beam 22 and a passed beam 24, each of which enter a respective spectrometer 30, 34. The spectrometers 30, 34 may comprise a bandwidth-sensitive measuring apparatus, e.g., they may include etalons for creating fringes the width of which are indicative of the bandwidth of the light measured and electrical circuits (not shown) for sensing the spectrometer fringes and providing an analog or digital input to a controller 40 which may be representative of the measurement. The etalon 30 may, e.g., be selected to have nominal bandpass values of, e.g., 0.12 pm FWHM, a free spectral range of, e.g., 3 pm at 193.36 nm, for an ArF laser bandwidth measurement, e.g., over a 10 mm aperture, and a peak transmission (ratio of the fringe peak photo-electrical signal and the input peak signal) of $\geq 50\%$ at 193.350 nm normal incidence. The etalon 34 may be selected to have nominal bandpass values of, e.g., 0.7 pm FWHM a free spectral range of, e.g., 20 pm at 193.36, for an ArF laser bandwidth measurement, e.g., over a __ mm aperture, and a peak transmission (ration f the fringe peak photo-electrical signal and the input peak signal) of $\geq$ __% at 193.350 nm normal incidence.

The bandwidth monitoring capability afforded by the present invention may assist in the application of the laser light beam 14, as an illuminating source for, e.g., exposing photoresist through a reticle (mask work) using projection optics with refracting components in sub-micron fabrication of integrated circuits, micromachines, nano-technologies, or the like ("photolithography").

It will be understood that this type of calibration can be employed with other bandwidth measurement instruments that are susceptible to the same or similar kinds of frequency dependent response issues.

It will be understood from the above that applicant has created an optical bandwidth measuring apparatus based upon parallel simultaneous measurements of an optical source, e.g., output from a laser, by utilizing the characteristics of two spectrometers with different impulse response functions. The two arms of the bandwidth measuring apparatus exhibit differential sensitivity to the energy content in different regions of the spectrum, and when combined with a simple but appropriate mathematical model can be used to estimate the source bandwidth more accurately than the prior art in the presence of spectral shape changes. The output of each of the two parallel bandwidth measuring sub-systems, e.g., the FWHM values of fringes created by each respective etalon spectrometer provide inputs to a system of simultaneous linear equations that can be used to find a good approximation of the actual FWHM and E95% widths of the laser light being measured.

Data taken for the measurements and simulations illustrated, e.g., in FIGS. 1–3 are provided by measurement of the FWHM and E95 widths of a set of source spectra from 193 nm line-narrowed ArF excimer lasers using high-resolution double-pass grating spectrometers manufactured by Laser Technik Berlin, while simultaneously determining the width of several etalon spectrometer fringes in response to the source spectrum inputs. The grating spectrometers were independently calibrated with a solid-state 193 nm source narrower in bandwidth than the grating spectrometer impulse response, this itself being independently verified with a high-finesse etalon. Plots of a real etalon spectrometer response to the FWHM and E95 width variations of NL-7000 single-oscillator laser spectra (FIG. 1) and response of simulated etalon spectrometers to actual spectra from XLA-100 master-oscillator power-amplifier configurations (FIGS. 2–3). The NL-7000 and XLA-100 are products of the assignee of the present application. From these plots the applicant discovered that the behavior of the output of an etalon spectrometer could be reasonably approximated by a plane surface, and therefore modeled using only three free parameters over the given range of source spectrum variations. The applicant also discovered from this data that the parameters in the model are sensitive to the bandwidth of the impulse response (bandpass) of the spectrometer employed. From this behavior the applicant devised the invention disclosed herein, by concluding that two such spectrometers could be employed simultaneously, and the differing response used to extract more information about the source spectrum than available using the prior art. In particular, the model is sufficiently accurate and easily inverted and as such can be employed to estimate the FWHM and E95 width of a source spectrum over a reasonable range of spectral shape variations as are commonly encountered with line-narrowed excimer lasers when properly calibrated.

According to the disclosed embodiment of the present invention the accuracy of on-board bandwidth metrology for lasers and other sources, e.g., spectral FWHM can be improved significantly and other metrics such as E95 width can be incorporated simultaneously. The choice of a particular metric as optimal for certain applications like delivering very spectrally pure light for photolithography is still under debate; however this method appears to be flexible enough to accommodate many different choices. In addition the optimal selection of, e.g., the difference in the bandpasses of the two etalon spectrometer sub-systems remains to be determined, as does the exact functional form of the model. As discussed below this can be determined empirically by comparing the response of the spectrometer to the actual variations in the source spectrum, and choosing the model and parameters accordingly to optimize performance, e.g., accuracy and ease of implementation.

Figure 5:
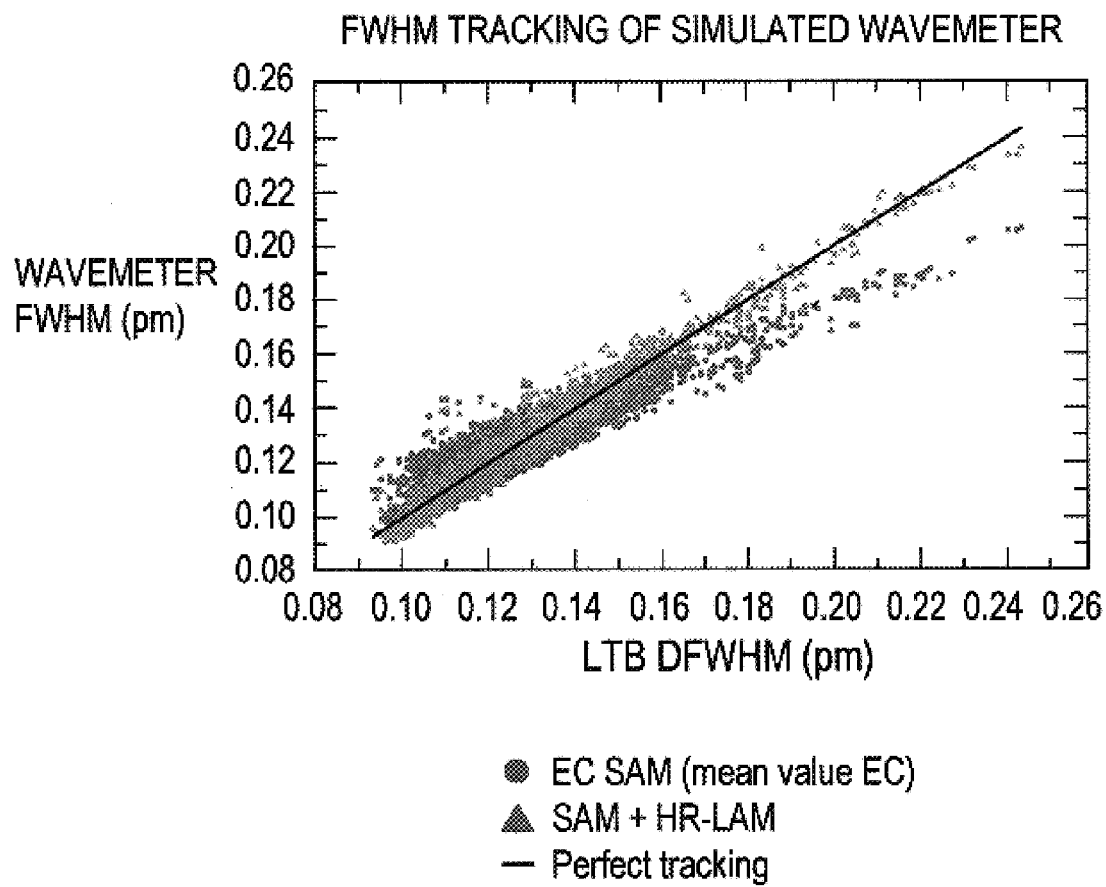
FIG. 5 shows a plot indicating the superior estimation of actual source FWHM bandwidth utilizing the present invention.
Figure 6:
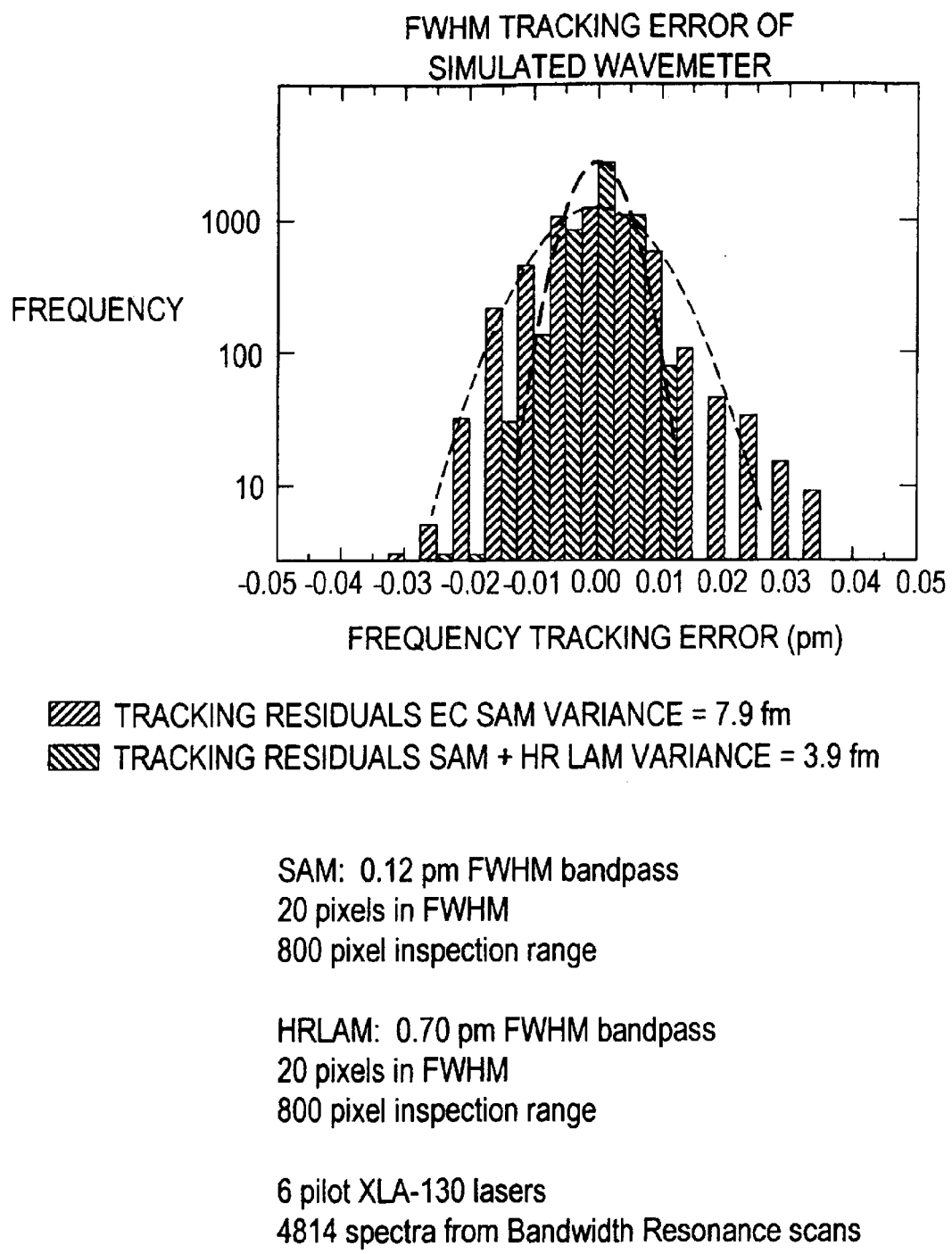
FIG. 6 shows the reduction in the error utilizing the present invention.
Figure 7:
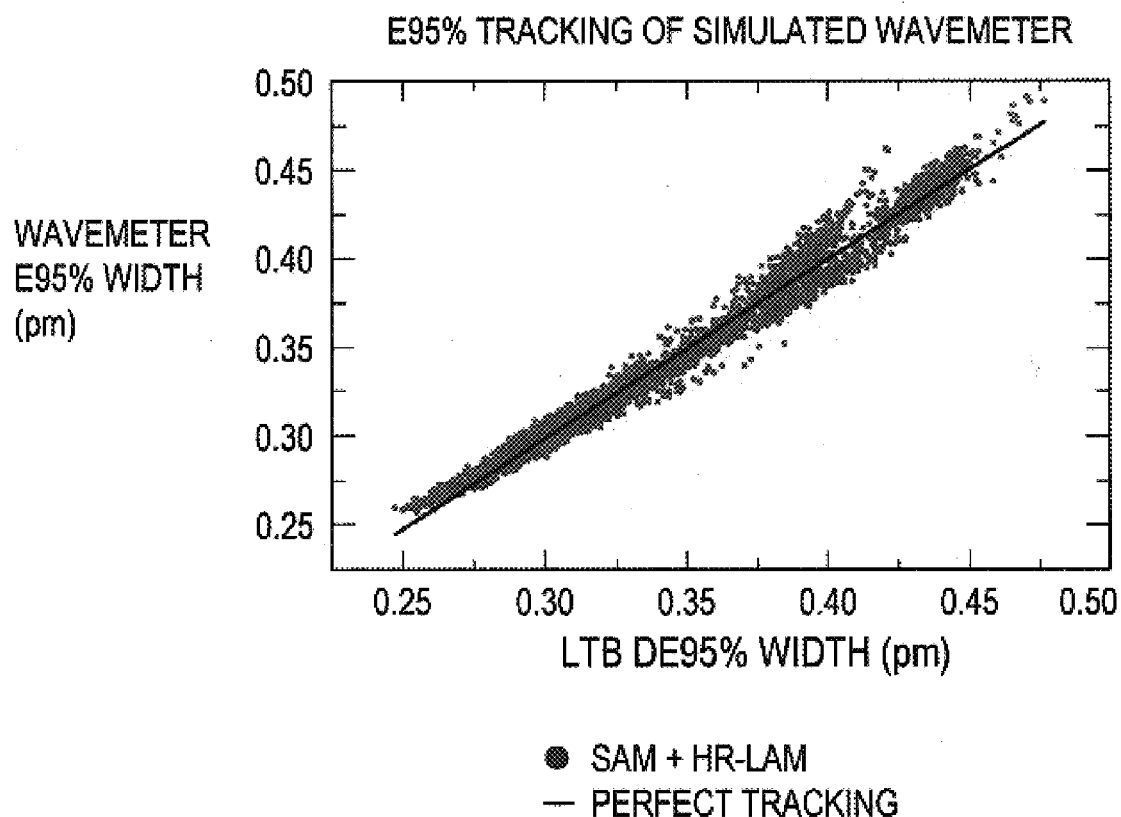
FIG. 7 illustrates the estimation of E95 utilizing a bandwidth meter made according to an embodiment of the present invention.
Figure 8:
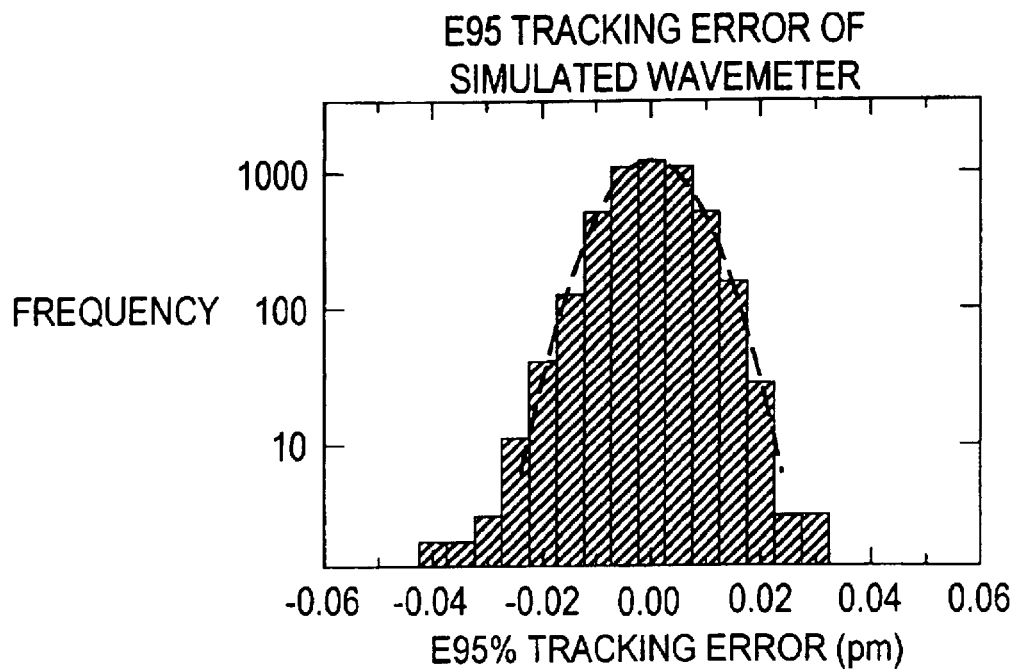
FIG. 8 illustrates the reduction in error of a simulated bandwidth meter made according to an embodiment of the present invention.

Turning now to FIG. 5 there is shown an illustration of the FWHM tracking capabilities of a simulated bandwidth-meter according to an embodiment of the present invention. Turning now to FIG. 6 there is shown an illustration of the FWHM tracking error (i.e., the discrepancy between the actual source spectrum FWHM and the FWHM reported by the bandwidth meter), showing a much narrower variance around a mean much closer to zero and the avoidance of discrepancies lying outside the expected statistical distribution. Large outliers represent a significant performance risk for modern bandwidth reporting systems. Turning now to FIG. 7 three is shown an illustration of the E95% tracking error of a simulated bandwidth detection apparatus according to the present invention. Turning now to FIG. 8 there is shown an illustration of E95 tracking error for the simulated bandwidth detection apparatus according to the present invention, measured in the tens of femto-meters.

The apparatus and method according to the described embodiment of the present invention provides overall improved predicted and actual tracking (e.g., ~a factor of 2 reduction in FWHM error variance) and reduces the incidence of outliers in tracking error, e.g., due to actual E95 changes in the measured light beam. The present invention also gives greatly improved portability of coefficients between calibration and operation under different conditions, e.g., variations in laser medium enrichment and manufacturing spectral variability. It also appears to offer more accurate on-board E95 tracking (e.g., ±0.015 pm) utilizing robust technology, e.g., etalons in parallel. This E95 tracking can be expected to improve over the prior art, e.g., which uses only a single etalon-spectrometer to estimate the source E95 width.

Those skilled in the art will appreciate that an aspect of the disclosed embodiment of the present invention is that the method and apparatus may be applied to calibrate the bandwidth-meter to provide a calculated output indicative of a particular source bandwidth metric, e.g., EX, where the measured metric is not of the same type, i.e., it could be the FWXM of the spectrometer fringe that is measured, which may be easier to more accurately detect and/or more computationally simple to compute from observable information.

It will also be recognized that the bandwidth metrics chosen for reporting and for input to the model may be chosen from a whole host of types, not all of which are listed herein. Those skilled in the art will understand that as a generalization of an embodiment of the present invention, $Z_1$ can be considered to be related to the source bandwidth as measured by one spectrometer and $Z_2$ can be considered to be related to the source bandwidth as measured by a second spectrometer acting in parallel. Also $BW_1$ can be considered to be a bandwidth measure of the source, e.g., the output of an excimer laser, that is desired to be known, and $BW_2$ can be a second such bandwidth measure of the source that is desired to be known. According to an embodiment of the present invention then, either $BW_1$ or $BW_2$ or both may be calculated from the outputs $Z_1$ and $Z_2$ of the parallel spectrometer sub-systems and a model having predetermined coefficients as described above, provided that models for the behavior of the individual spectrometer sub-systems in response to changes in $BW_1$ and $BW_2$ is chosen appropriately and can be simultaneously inverted to solve for the desired quantities.

It will also be understood that the "actual" source bandwidth cannot be precisely measured without access to a spectrometer with resolving power greatly exceeding the actual bandwidth of the source. Even perfect calibration constant coefficients according to an embodiment of the present invention would have at least the error inherent in the calibrating spectrometer measurement, which may be small, but still finite—plus the error in the approximating model. The applicant estimates such error to be in the femto-meter range for spectral shape changes in line-narrowed excimer lasers the applicant has observed. Therefore the terms "source bandwidth" and "actual source bandwidth" used in the specification and claims refer to the bandwidth measured by a suitably accurate calibrating instrument, grating spectrometer or otherwise. Similarly, the estimated "source bandwidth" as reported by the invention disclosed herein is not the actual source bandwidth, but an estimate is much closer to what the suitably accurate calibrating instrument would report than would be expected from prior art bandwidth-meters. This is especially true in the presence of spectral shape changes incurred during normal operation of excimer lasers which may pronouncedly interfere with the ability of existing bandwidth-meters to report the source bandwidth with the required degree of confidence.

Those skilled in the art will appreciate that the apparatus and methods of the present invention includes mathematical approximations and calibration methods that make the apparatus simple to implement using straightforward mathematics, and does not require detailed knowledge of the spectral shape of the input source or impulse response functions of the spectrometer(s). Those skilled in the art will also appreciate that a feature of the described embodiment of the present invention is that it is relatively computationally simple, involving simple mathematical operations.

The above-described embodiments of the present invention are intended only for explanation and illustration purposes and are not the only embodiments in which the present invention may reside. Those skilled in the art will understand that many modifications and changes may be made to the described embodiments without changing the intent and spirit of the present invention. For example, other wavelength-discriminating apparatus (spectrometers) besides etalon spectrometers may be utilized to provide the parallel bandwidth measurements and calibrations. A wide range of bandpass values or differing impulse response functions for the two parallel bandwidth detectors may be utilized and certain ranges and/or combinations may prove better for different applications, varying requirements for wavelength, bandwidth, etc. In addition, while the present invention has been explained with an embodiment utilizing two etalon spectrometers and two plane models, it may be possible to implement the invention utilizing, e.g., more than two etalons/spectrometers instead of two, and/or possibly some other kind of modeling different from the plane z=Ax+By+C (e.g., other relatively simple surfaces, e.g., a parabolic surface, depending on what the spectral variations in the source are expected to be what kind of spectrometers are used). The scope of the present invention, therefore, should be considered in light only of the appended claims and legal equivalents.

I claim:

1. A bandwidth meter for measuring the bandwidth of a spectrum of light emitted from a laser input to the bandwidth meter comprising:

a first optical bandwidth detector providing a first output representative of a parameter which is indicative of the bandwidth of the light emitted from the laser as actually measured by the first bandwidth detector;

a second optical bandwidth detector providing a second output representative of a parameter which is indicative of bandwidth of the light emitted from the laser as actually measured by the second bandwidth detector; and, an actual bandwidth calculation apparatus adapted to utilize the first output and the second output as part of a multivariable linear equation employing predetermined calibration variables specific to either the first bandwidth detector or the second bandwidth detector, to calculate an actual bandwidth parameter.

2. The apparatus of claim 1 further comprising:

the actual bandwidth parameter is a spectrum full width at some percent of the maximum within the full width of the spectrum of light emitted from the laser ("FWXM").

3. The apparatus of claim 1, further comprising:

the actual bandwidth parameter is a width between two points on the spectrum defining a content of the spectrum containing some percentage of the energy of the full spectrum of the spectrum of light emitted from the laser ("EX").

4. The apparatus of claim 1 further comprising:

the first bandwidth detector is an etalon and the first output is representative of a fringe width of a fringe of an optical output of the etalon at FWXM; and, the second bandwidth detector is an etalon and the second output is representative of a fringe width of an optical output of the etalon at FWXM.

5. The apparatus of claim 2 further comprising:

the first bandwidth detector is an etalon and the first output representative of a fringe width of a fringe of an optical output of the etalon at FWXM, and, the second bandwidth detector is an etalon and the second output is a fringe width of an optical output of the etalon at FWXM.

6. The apparatus of claim 3 further comprising:

the first bandwidth detector is an etalon and the first output representative of a fringe width of a fringe of an optical output of the etalon at FWXM; and, the second bandwidth detector is an etalon and the second output is a fringe width of an optical output of the etalon at FWXM.

7. The apparatus of claim 1, further comprising:

the precomputed calibration variables are derived from a three dimensional plot representing the first output of the first bandwidth detector in relation to a calibrating input light with known values of a first actual bandwidth parameter and of a second actual bandwidth parameter, and from a three dimensional plot representing the second output of the second bandwidth detector in relation to a calibrating input light with known values of a first actual bandwidth parameter and of a second actual bandwidth parameter.

8. The apparatus of claim 2, further comprising:

the precomputed calibration variables are derived from a three dimensional plot representing the first output of the first bandwidth detector in relation to a calibrating input light with known values of a first actual bandwidth parameter and of a second actual bandwidth parameter, and from a three dimensional plot representing the second output of the second bandwidth detector in relation to a calibrating input light with known values of the first actual bandwidth parameter and of the second actual bandwidth parameter.

9. The apparatus of claim 3, further comprising:

the precomputed calibration variables are derived from a three dimensional plot representing the first output of the first bandwidth detector in relation to a calibrating input light with known values of the first actual bandwidth parameter and of the second actual bandwidth parameter, and from a three dimensional plot representing the second output of the second bandwidth detector in relation to a calibrating input light with known values of the first actual bandwidth parameter and of the second actual bandwidth parameter.

10. The apparatus of claim 4, further comprising:

the precomputed calibration variables are derived from a three dimensional plot representing the first output of the first bandwidth detector in relation to a calibrating input light with known values of the first actual bandwidth parameter and of the second actual bandwidth parameter, and from a three dimensional plot representing the second output of the second bandwidth detector in relation to a calibrating input light with known values of the first actual bandwidth parameter and of the second actual bandwidth parameter.

11. The apparatus of claim 5, further comprising:

the precomputed calibration variables are derived from a three dimensional plot representing the first output of the first bandwidth detector in relation to a calibrating input light with known values of the first actual bandwidth parameter and of the second actual bandwidth parameter, and from a three dimensional plot representing the second output of the second bandwidth detector in relation to a calibrating input light with known values of the first actual bandwidth parameter and of the second actual bandwidth parameter.

12. The apparatus of claim 6, further comprising:

the precomputed calibration variables are derived from a three dimensional plot representing the first output of the first bandwidth detector in relation to a calibrating input light with known values of the first actual bandwidth parameter and of the second actual bandwidth parameter, and from a three dimensional plot representing the second output of the second bandwidth detector in relation to a calibrating input light with known values of the first actual bandwidth parameter and of the second actual bandwidth parameter.

13. The apparatus of claim 7, further comprising:

the first actual bandwidth parameter is a spectrum FWXM of the spectrum of light emitted from the laser; and, the second actual bandwidth parameter is an EX of the spectrum of light emitted from the laser.

14. The apparatus of claim 8, further comprising:

the first actual bandwidth parameter is a spectrum FWXM of the spectrum of light emitted from the laser; and, the second actual bandwidth parameter is an EX of the spectrum of light emitted from the laser.

15. The apparatus of claim 9, further comprising:

the first actual bandwidth parameter is a spectrum FWXM of the spectrum of light emitted from the laser; and, the second actual bandwidth parameter is an EX of the spectrum of light emitted from the laser.

16. The apparatus of claim 10, further comprising:

the first actual bandwidth parameter is a spectrum FWHM of the spectrum of light emitted from the laser; and, the second actual bandwidth parameter is an EX of the spectrum of light emitted from the laser.

17. The apparatus of claim 11, further comprising:

the first actual bandwidth parameter is a spectrum FWHM of the spectrum of light emitted from the laser; and, the second actual bandwidth parameter is an EX of the spectrum of light emitted from the laser.

18. The apparatus of claim 12, further comprising:

the first actual bandwidth parameter is a spectrum FWHM of the spectrum of light emitted from the laser; and, the second actual bandwidth parameter is an EX of the spectrum of light emitted from the laser.

19. The apparatus of claim 13, further comprising:

the first three dimensional plot provides the solution:

(first output)=$(a^*$(calibrating input light known value of $FWXM$))+$(b^*$ (calibrating input light known value of $EX$)+$c$; and the second three dimensional plot provides the solution:

(second output)=$(d^*$(calibrating input light known value of $FWXM$))+$(e^*$ (calibrating input light known value of $EX$)+$f$; and the actual bandwidth calculation apparatus uses the derived equation:

(first actual bandwidth parameter)=$((b^*$(second output))−$(e^*$(first output))+$ce$−$bf)/(bd$−$ae)$, or the equation:

(second actual bandwidth parameter)=$((a^*$(second output))−$(d^*$(first output)) +$cd$−$af)/(ae$−$bd)$.

20. The apparatus of claim 14, further comprising:

the first three dimensional plot provides the solution:

(first output)=$(a^*$(calibrating input light known value of $FWXM$))+$(b^*$ (calibrating input light known value of $EX$)+$c$; and the second three dimensional plot provides the solution:

(second output)=$(d^*$(calibrating input light known value of $FWXM$))+$(e^*$ (calibrating input light known value of $EX$)+$f$; and the actual bandwidth calculation apparatus uses the derived equation:

(first actual bandwidth parameter)=$((b*(\text{second output}))-(e*(\text{first output}))+ce-bf)/(bd-ae)$, or the equation:

(second actual bandwidth parameter)=$((a*(\text{second output}))-(d*(\text{first output}))+cd-af)/(ae-bd)$.

21. The apparatus of claim 15, further comprising:

the first three dimensional plot provides the solution:

(first output)=$(a*(\text{calibrating input light known value of } FWXM))+(b*(\text{calibrating input light known value of } EX)+c$; and the second three dimensional plot provides the solution:

(second output)=$(d*(\text{calibrating input light known value of } FWXM))+(e*(\text{calibrating input light known value of } EX)+f$; and the actual bandwidth calculation apparatus uses the derived equation:

(first actual bandwidth parameter)=$((b*(\text{second output}))-(e*(\text{first output}))+ce-bf)/(bd-ae)$, or the equation:

(second actual bandwidth parameter)=$((a*(\text{second output}))-(d*(\text{first output}))+cd-af)/(ae-bd)$.

22. The apparatus of claim 16, further comprising:

the first three dimensional plot provides the solution:

(first output)=$(a*(\text{calibrating input light known value of } FWXM))+(b*(\text{calibrating input light known value of } EX)+c$; and the second three dimensional plot provides the solution:

(second output)=$(d*(\text{calibrating input light known value of } FWXM))+(e*(\text{calibrating input light known value of } EX)+f$; and the actual bandwidth calculation apparatus uses the derived equation:

(first actual bandwidth parameter)=$((b*(\text{second output}))-(e*(\text{first output}))+ce-bf)/(bd-ae)$, or the equation:

(second actual bandwidth parameter)=$((a*(\text{second output}))-(d*(\text{first output}))+cd-af)/(ae-bd)$.

23. The apparatus of claim 17, further comprising:

the first three dimensional plot provides the solution:

(first output)=$(a*(\text{calibrating input light known value of } FWXM))+(b*(\text{calibrating input light known value of } EX)+c$; and the second three dimensional plot provides the solution:

(second output)=$(d*(\text{calibrating input light known value of } FWXM))+(e*(\text{calibrating input light known value of } EX)+f$; and the actual bandwidth calculation apparatus uses the derived equation:

(first actual bandwidth parameter)=$((b*(\text{second output}))-(e*(\text{first output}))+ce-bf)/(bd-ae)$, or the equation:

(second actual bandwidth parameter)=$((a*(\text{second output}))-(d*(\text{first output}))+cd-af)/(ae-bd)$.

24. The apparatus of claim 18, further comprising:

the first three dimensional plot provides the solution:

(first output)=$(a*(\text{calibrating input light known value of } FWXM))+(b*(\text{calibrating input light known value of } EX)+c$; and the second three dimensional plot provides the solution:

(second output)=$(d*(\text{calibrating input light known value of } FWXM))+(e*(\text{calibrating input light known value of } EX)+f$; and the actual bandwidth calculation apparatus uses the derived equation:

(first actual bandwidth parameter)=$((b*(\text{second output}))-(e*(\text{first output}))+ce-bf)/(bd-ae)$, or the equation:

(second actual bandwidth parameter)=$((a*(\text{second output}))-(d*(\text{first output}))+cd-af)/(ae-bd)$.

25. The apparatus of claim 19, further comprising:

the calibrating input light known value of FWXM is FWHM and the first actual bandwidth parameter is FWHM and the calibrating input light known value of EX is E95 and the second actual bandwidth parameter is E95.

26. The apparatus of claim 20, further comprising:

the calibrating input light known value of FWXM is FWHM and the first actual bandwidth parameter is FWHM and the calibrating input light known value of EX is E95 and the second actual bandwidth parameter is E95.

27. The apparatus of claim 21, further comprising:

the calibrating input light known value of FWXM is FWHM and the first actual bandwidth parameter is FWHM and the calibrating input light known value of EX is E95 and the second actual bandwidth parameter is E95.

28. The apparatus of claim 22, further comprising:

the calibrating input light known value of FWXM is FWHM and the first actual bandwidth parameter is FWHM and the calibrating input light known value of EX is. E95 and the second actual bandwidth parameter is E95.

29. The apparatus of claim 23, further comprising:

the calibrating input light known value of FWXM is FWHM and the first actual bandwidth parameter is FWHM and the calibrating input light known value of EX is E95 and the second actual bandwidth parameter is E95.

30. The apparatus of claim 24, further comprising:

the calibrating input light known value of FWXM is FWHM and the first actual bandwidth parameter is FWHM and the calibrating input light known value of EX is E95 and the second actual bandwidth parameter is E95.

31. The apparatus of claim 19, further comprising:
the transfer function of the first optical bandwidth detector is selected to be much more sensitive to FWXM than to EX and the transfer function of the second optical bandwidth detector is selected to be much more sensitive to EX than to FWXM.

32. The apparatus of claim 20, further comprising:
the transfer function of the first optical bandwidth detector is selected to be much more sensitive to FWXM than to EX and the transfer function of the second optical bandwidth detector is selected to be much more sensitive to EX than to FWXM.

33. The apparatus of claim 21, further comprising:
the transfer function of the first optical bandwidth detector is selected to be much more sensitive to FWXM than to EX and the transfer function of the second optical bandwidth detector is selected to be much more sensitive to EX than to FWXM.

34. The apparatus of claim 22, further comprising:
the transfer function of the first optical bandwidth detector is selected to be much more sensitive to FWXM than to EX and the transfer function of the second optical bandwidth detector is selected to be much more sensitive to EX than to FWXM.

35. The apparatus of claim 23, further comprising:
the transfer function of the first optical bandwidth detector is selected to be much more sensitive to FWXM than to EX and the transfer function of the second optical bandwidth detector is selected to be much more sensitive to EX than to FWXM.

36. The apparatus of claim 24, further comprising:
the transfer function of the first optical bandwidth detector is selected to be much more sensitive to FWXM than to EX and the transfer function of the second optical bandwidth detector is selected to be much more sensitive to EX than to FWXM.

37. A photolithography light source comprising:
a laser light source; and,
a bandwidth meter for measuring the bandwidth of a spectrum of light emitted from the laser input to the bandwidth meter comprising:
a first wavelength sensitive optical bandwidth detector providing a first output representative of a first parameter which is indicative of the bandwidth of the light emitted from the laser as actually measured by the first bandwidth detector;
a second wavelength sensitive optical bandwidth detector providing a second output representative of the first parameter which is indicative of bandwidth of the light emitted from the laser as actually measured by the second bandwidth detector; and,
an actual bandwidth calculation apparatus adapted to utilize the first output and the second output as part of a multivariable linear equation employing predetermined calibration variables specific to either the first bandwidth detector or the second bandwidth detector, to calculate a first actual bandwidth parameter or a second actual bandwidth parameter for the light emitted from the laser.

38. The apparatus of claim 37 further comprising:
the first actual bandwidth parameter is a spectrum full width at some percent of the maximum within the full width of the spectrum of light emitted from the laser ("FWXM").

39. The apparatus of claim 37, further comprising:
the second actual bandwidth parameter is a width between two points on the spectrum defining a content of the spectrum containing some percentage of the energy of the full spectrum of the spectrum of light emitted from the laser ("EX").

40. The apparatus of claim 37 further comprising:
the first bandwidth detector is and etalon and the first output is representative of a fringe width of a fringe of an optical output of the etalon at FWXM; and,
the second bandwidth detector is an etalon and the second output is represented of a fringe width of an optical output of the etalon at FWXM.

41. The apparatus of claim 38 further comprising:
the first bandwidth detector is and etalon and the first output representative of a fringe width of a fringe of an optical output of the etalon at FWXM, and,
the second bandwidth detector is an etalon and the second output is a fringe width of an optical output of the etalon at FWXM.

42. The apparatus of claim 39 further comprising:
the first bandwidth detector is and etalon and the first output representative of a fringe width of a fringe of an optical output of the etalon at FWXM; and,
the second bandwidth detector is an etalon and the second output is a fringe width of an optical output of the etalon at FWXM.

43. The apparatus of claim 37, further comprising:
the precomputed calibration variables are derived from a three dimensional plot representing the first output of the first bandwidth detector in relation to a calibrating input light with known values of the first actual bandwidth parameter and of the second actual bandwidth parameter, and from a three dimensional plot representing the second output of the second bandwidth detector in relation to a calibrating input light with known values of the first actual bandwidth parameter and of the second actual bandwidth parameter.

44. The apparatus of claim 38, further comprising:
the precomputed calibration variables are derived from a three dimensional plot representing the first output of the first bandwidth detector in relation to a calibrating input light with known values of the first actual bandwidth parameter and of the second actual bandwidth parameter, and from a three dimensional plot representing the second output of the second bandwidth detector in relation to a calibrating input light with known values of the first actual bandwidth parameter and of the second actual bandwidth parameter.

45. The apparatus of claim 39, further comprising:
the precomputed calibration variables are derived from a three dimensional plot representing the first output of the first bandwidth detector in relation to a calibrating input light with known values of the first actual bandwidth parameter and of the second actual bandwidth parameter, and from a three dimensional plot representing the second output of the second bandwidth detector in relation to a calibrating input light with known values of the first actual bandwidth parameter and of the second actual bandwidth parameter.

46. The apparatus of claim 40, further comprising:
the precomputed calibration variables are derived from a three dimensional plot representing the first output of the first bandwidth detector in relation to a calibrating input light with known values of the first actual bandwidth parameter and of the second actual bandwidth parameter, and from a three dimensional plot representing the second output of the second bandwidth detector in relation to a calibrating input light with known values of the first actual bandwidth parameter and of the second actual bandwidth parameter.

47. The apparatus of claim 41, further comprising:

the precomputed calibration variables are derived from a three dimensional plot representing the first output of the first bandwidth detector in relation to a calibrating input light with known values of the first actual bandwidth parameter and of the second actual bandwidth parameter, and from a three dimensional plot representing the second output of the second bandwidth detector in relation to a calibrating input light with known values of the first actual bandwidth parameter and of the second actual bandwidth parameter.

48. The apparatus of claim 42, further comprising:

the precomputed calibration variables are derived from a three dimensional plot representing the first output of the first bandwidth detector in relation to a calibrating input light with known values of the first actual bandwidth parameter and of the second actual bandwidth parameter, and from a three dimensional plot representing the second output of the second bandwidth detector in relation to a calibrating input light with known values of the first actual bandwidth parameter and of the second actual bandwidth parameter.

49. The apparatus of claim 43, further comprising:

the first actual bandwidth parameter is a spectrum FWXM of the spectrum of light emitted from the laser; and, the second actual bandwidth parameter is an EX of the spectrum of light emitted from the laser.

50. The apparatus of claim 44, further comprising:

the first actual bandwidth parameter is a spectrum FWXM of the spectrum of light emitted from the laser; and, the second actual bandwidth parameter is an EX of the spectrum of light emitted from the laser.

51. The apparatus of claim 45, further comprising:

the first actual bandwidth parameter is a spectrum FWXM of the spectrum of light emitted from the laser; and, the second actual bandwidth parameter is an EX of the spectrum of light emitted from the laser.

52. The apparatus of claim 46, further comprising:

the first actual bandwidth parameter is a spectrum FWHM of the spectrum of light emitted from the laser; and, the second actual bandwidth parameter is an EX of the spectrum of light emitted from the laser.

53. The apparatus of claim 47, further comprising:

the first actual bandwidth parameter is a spectrum FWHM of the spectrum of light emitted from the laser; and, the second actual bandwidth parameter is an EX of the spectrum of light emitted from the laser.

54. The apparatus of claim 48, further comprising:

the first actual bandwidth parameter is a spectrum FWHM of the spectrum of light emitted from the laser; and, the second actual bandwidth parameter is an EX of the spectrum of light emitted from the laser.

55. The apparatus of claim 49, further comprising:

the first three dimensional plot provides the solution:

$$(\text{first output}) = (a^*(\text{calibrating input light known value of } FWXM)) + (b^* (\text{calibrating input light known value of } EX) + c; \text{ and}$$

the second three dimensional plot provides the solution:

$$(\text{second output}) = (d^*(\text{calibrating input light known value of } FWXM)) + (e^* (\text{calibrating input light known value of } EX) + f;$$
and the actual bandwidth calculation apparatus uses the derived equation:

$$(\text{first actual bandwidth parameter}) = ((b^*(\text{second output})) - (e^*(\text{first output})) + ce - bf)/(bd - ae),$$

or the equation:

$$(\text{second actual bandwidth parameter}) = ((a^*(\text{second output})) - (d^*(\text{first output})) + cd - af)/(ae - bd).$$

56. The apparatus of claim 50, further comprising:

the first three dimensional plot provides the solution:

$$(\text{first output}) = (a^*(\text{calibrating input light known value of } FWXM)) + (b^* (\text{calibrating input light known value of } EX) + c; \text{ and}$$

the second three dimensional plot provides the solution:

$$(\text{second output}) = (d^*(\text{calibrating input light known value of } FWXM)) + (e^* (\text{calibrating input light known value of } EX) + f;$$
and the actual bandwidth calculation apparatus uses the derived equation:

$$(\text{first actual bandwidth parameter}) = ((b^*(\text{second output})) - (e^*(\text{first output})) + ce - bf)/(bd - ae),$$

or the equation:

$$(\text{second actual bandwidth parameter}) = ((a^*(\text{second output})) - (d^*(\text{first output})) + cd - af)/(ae - bd).$$

57. The apparatus of claim 51, further comprising:

the first three dimensional plot provides the solution:

$$(\text{first output}) = (a^*(\text{calibrating input light known value of } FWXM)) + (b^* (\text{calibrating input light known value of } EX) + c; \text{ and}$$

the second three dimensional plot provides the solution:

$$(\text{second output}) = (d^*(\text{calibrating input light known value of } FWXM)) + (e^* (\text{calibrating input light known value of } EX) + f;$$
and the actual bandwidth calculation apparatus uses the derived equation:

$$(\text{first actual bandwidth parameter}) = ((b^*(\text{second output})) - (e^*(\text{first output})) + ce - bf)/(bd - ae),$$

or the equation:

$$(\text{second actual bandwidth parameter}) = ((a^*(\text{second output})) - (d^*(\text{first output})) + cd - af)/(ae - bd).$$

58. The apparatus of claim 52, further comprising:

the first three dimensional plot provides the solution:

$$(\text{first output}) = (a^*(\text{calibrating input light known value of } FWXM)) + (b^* (\text{calibrating input light known value of } EX) + c; \text{ and}$$

the second three dimensional plot provides the solution:

(second output)=(d*(calibrating input light known value of FWXM))+(e* (calibrating input light known value of EX)+f; and the actual bandwidth calculation apparatus uses the derived equation:

(first actual bandwidth parameter)=((b*(second output))−(e*(first output))+ce−bf)/(bd−ae), or the equation:

(second actual bandwidth parameter)=((a*(second output))−(d*(first output)) +cd−af)/(ae−bd).

59. The apparatus of claim 53, further comprising:

the first three dimensional plot provides the solution:

(first output)=(a*(calibrating input light known value of FWXM))+(b* (calibrating input light known value of EX)+c; and the second three dimensional plot provides the solution:

(second output)=(d*(calibrating input light known value of FWXM))+(e* (calibrating input light known value of EX)+f; and the actual bandwidth calculation apparatus uses the derived equation:

(first actual bandwidth parameter)=((b*(second output))−(e*(first output))+ce−bf)/(bd−ae), or the equation:

(second actual bandwidth parameter)=((a*(second output))−(d*(first output)) +cd−af)/(ae−bd).

60. The apparatus of claim 54, further comprising:

the first three dimensional plot provides the solution:

(first output)=(a*(calibrating input light known value of FWXM))+(b* (calibrating input light known value of EX)+c; and the second three dimensional plot provides the solution:

(second output)=(a*(calibrating input light known value of FWXM))+(e* (calibrating input light known value of EX)+f; and the actual bandwidth calculation apparatus uses the derived equation:

(first actual bandwidth parameter)=((b*(second output))−(e*(first output))+ce−bf)/(bd−ae), or the equation:

(second actual bandwidth parameter)=((a*(second output))−(d*(first output)) +cd−af)/(ae−bd).

61. The apparatus of claim 55, further comprising:

the calibrating input light known value of FWXM is FWHM and the first actual bandwidth parameter is FWHM and the calibrating input light known value of EX is E95 and the second actual bandwidth parameter is E95.

62. The apparatus of claim 56, further comprising:

the calibrating input light known value of FWXM is FWHM and the first actual bandwidth parameter is FWHM and the calibrating input light known value of EX is E95 and the second actual bandwidth parameter is E95.

63. The apparatus of claim 57, further comprising:

the calibrating input light known value of FWXM is FWHM and the first actual bandwidth parameter is FWHM and the calibrating input light known value of EX is E95 and the second actual bandwidth parameter is E95.

64. The apparatus of claim 58, further comprising:

the calibrating input light known value of FWXM is FWHM and the first actual bandwidth parameter is FWHM and the calibrating input light known value of EX is E95 and the second actual bandwidth parameter is E95.

65. The apparatus of claim 59, further comprising:

the calibrating input light known value of FWXM is FWHM and the first actual bandwidth parameter is FWHM and the calibrating input light known value of EX is E95 and the second actual bandwidth parameter is E95.

66. The apparatus of claim 60, further comprising:

the calibrating input light known value of FWXM is FWHM and the first actual bandwidth parameter is FWHM and the calibrating input light known value of EX is E95 and the second actual bandwidth parameter is E95.

67. The apparatus of claim 55, further comprising:

the transfer function of the first optical bandwidth detector is selected to be much more sensitive to FWXM than to EX and the transfer function of the second optical bandwidth detector is selected to be much more sensitive to EX than to FWXM.

68. The apparatus of claim 56, further comprising:

the transfer function of the first optical bandwidth detector is selected to be much more sensitive to FWXM than to EX and the transfer function of the second optical bandwidth detector is selected to be much more sensitive to EX than to FWXM.

69. The apparatus of claim 57, further comprising:

the transfer function of the first optical bandwidth detector is selected to be much more sensitive to FWXM than to EX and the transfer function of the second optical bandwidth detector is selected to be much more sensitive to EX than to FWXM.

70. The apparatus of claim 58, further comprising:

the transfer function of the first optical bandwidth detector is selected to be much more sensitive to FWXM than to EX and the transfer function of the second optical bandwidth detector is selected to be much more sensitive to EX than to FWXM.

71. The apparatus of claim 59, further comprising:

the transfer function of the first optical bandwidth detector is selected to be much more sensitive to FWXM than to EX and the transfer function of the second optical bandwidth detector is selected to be much more sensitive to EX than to FWXM.

72. The apparatus of claim 60, further comprising:

the transfer function of the first optical bandwidth detector is selected to be much more sensitive to FWXM than to EX and the transfer function of the second optical bandwidth detector is selected to be much more sensitive to EX than to FWXM.

73. A photolithography tool comprising:

a photolithography light source comprising:

a bandwidth meter for measuring the bandwidth of a spectrum of light emitted from a laser input to the bandwidth meter comprising:

a first wavelength sensitive optical bandwidth detector providing a first output representative of a first parameter which is indicative of the bandwidth of the light emitted from the laser as actually measured by the first bandwidth detector;

a second wavelength sensitive optical bandwidth detector providing a second output representative of the first parameter which is indicative of bandwidth of the light emitted from the laser as actually measured by the second bandwidth detector; and, an actual bandwidth calculation apparatus adapted to utilize the first output and the second output as part of a multivariable linear equation employing predetermined calibration variables specific to either the first bandwidth detector or the second bandwidth detector, to calculate a first actual bandwidth parameter or a second actual bandwidth parameter for the light emitted from the laser.

74. The apparatus of claim 73 further comprising:

the first actual bandwidth parameter is a spectrum full width at some percent of the maximum within the full width of the spectrum of light emitted from the laser ("FWXM").

75. The apparatus of claim 73, further comprising:

the second actual bandwidth parameter is a width between two points on the spectrum defining a content of the spectrum containing some percentage of the energy of the full spectrum of the spectrum of light emitted from the laser ("EX").

76. The apparatus of claim 73 further comprising:

the first bandwidth detector is and etalon and the first output is representative of a fringe width of a fringe of an optical output of the etalon at FWXM; and, the second bandwidth detector is an etalon and the second output is representative of a fringe width of an optical output of the etalon at FWXM.

77. The apparatus of claim 74 further comprising:

the first bandwidth detector is and etalon and the first output representative of a fringe width of a fringe of an optical output of the etalon at FWXM, and, the second bandwidth detector is an etalon and the second output is a fringe width of an optical output of the etalon at FWXM.

78. The apparatus of claim 75 further comprising:

the first bandwidth detector is and etalon and the first output representative of a fringe width of a fringe of an optical output of the etalon at FWXM; and, the second bandwidth detector is an etalon and the second output is a fringe width of an optical output of the etalon at FWXM.

79. The apparatus of claim 73, further comprising:

the precomputed calibration variables are derived from a three dimensional plot representing the first output of the first bandwidth detector in relation to a calibrating input light with known values of the first actual bandwidth parameter and of the second actual bandwidth parameter, and from a three dimensional plot representing the second output of the second bandwidth detector in relation to a calibrating input light with known values of the first actual bandwidth parameter and of the second actual bandwidth parameter.

80. The apparatus of claim 74, further comprising:

the precomputed calibration variables are derived from a three dimensional plot representing the first output of the first bandwidth detector in relation to a calibrating input light with known values of the first actual bandwidth parameter and of the second actual bandwidth parameter, and from a three dimensional plot representing the second output of the second bandwidth detector in relation to a calibrating input light with known values of the first actual bandwidth parameter and of the second actual bandwidth parameter.

81. The apparatus of claim 75, further comprising:

the precomputed calibration variables are derived from a three dimensional plot representing the first output of the first bandwidth detector in relation to a calibrating input light with known values of the first actual bandwidth parameter and of the second actual bandwidth parameter, and from a three dimensional plot representing the second output of the second bandwidth detector in relation to a calibrating input light with known values of the first actual bandwidth parameter and of the second actual bandwidth parameter.

82. The apparatus of claim 76, further comprising:

the precomputed calibration variables are derived from a three dimensional plot representing the first output of the first bandwidth detector in relation to a calibrating input light with known values of the first actual bandwidth parameter and of the second actual bandwidth parameter, and from a three dimensional plot representing the second output of the second bandwidth detector in relation to a calibrating input light with known values of the first actual bandwidth parameter and of the second actual bandwidth parameter.

83. The apparatus of claim 77, further comprising:

the precomputed calibration variables are derived from a three dimensional plot representing the first output of the first bandwidth detector in relation to a calibrating input light with known values of the first actual bandwidth parameter and of the second actual bandwidth parameter, and from a three dimensional plot representing the second output of the second bandwidth detector in relation to a calibrating input light with known values of the first actual bandwidth parameter and of the second actual bandwidth parameter.

84. The apparatus of claim 78, further comprising:

the precomputed calibration variables are derived from a three dimensional plot representing the first output of the first bandwidth detector in relation to a calibrating input light with known values of the first actual bandwidth parameter and of the second actual bandwidth parameter, and from a three dimensional plot representing the second output of the second bandwidth detector in relation to a calibrating input light with known values of the first actual bandwidth parameter and of the second actual bandwidth parameter.

85. The apparatus of claim 79, further comprising:

the first actual bandwidth parameter is a spectrum FWXM of the spectrum of light emitted from the laser; and, the second actual bandwidth parameter is an EX of the spectrum of light emitted from the laser.

86. The apparatus of claim 80, further comprising:

the first actual bandwidth parameter is a spectrum FWXM of the spectrum of light emitted from the laser; and, the second actual bandwidth parameter is an EX of the spectrum of light emitted from the laser.

87. The apparatus of claim 81, further comprising:

the first actual bandwidth parameter is a spectrum FWXM of the spectrum of light emitted from the laser; and, the second actual bandwidth parameter is an EX of the spectrum of light emitted from the laser.

88. The apparatus of claim 82, further comprising:

the first actual bandwidth parameter is a spectrum FWHM of the spectrum of light emitted from the laser; and, the second actual bandwidth parameter is an EX of the spectrum of light emitted from the laser.

89. The apparatus of claim 83, further comprising:

the first actual bandwidth parameter is a spectrum FWHM of the spectrum of light emitted from the laser; and, the second actual bandwidth parameter is an EX of the spectrum of light emitted from the laser.

90. The apparatus of claim 84, further comprising:

the first actual bandwidth parameter is a spectrum FWHM of the spectrum of light emitted from the laser; and, the second actual bandwidth parameter is an EX of the spectrum of light emitted from the laser.

91. The apparatus of claim 85, further comprising:

the first three dimensional plot provides the solution:

(first output)=$(a*$(calibrating input light known value of $FWXM))+(b*$ (calibrating input light known value of $EX)+c$; and the second three dimensional plot provides the solution:

(second output)=$(d*$(calibrating input light known value of $FWXM))+(e*$ (calibrating input light known value of $EX)+f$; and the actual bandwidth calculation apparatus uses the derived equation:

(first actual bandwidth parameter)=$((b*$(second output))$-(e*$(first output))$+ce-bf)/(bd-ae)$, or the equation:

(second actual bandwidth parameter)=$((a*$(second output))$-(d*$(first output)) $+cd-af)/(ae-bd)$.

92. The apparatus of claim 86, further comprising:

the first three dimensional plot provides the solution:

(first output)=$(a*$(calibrating input light known value of $FWXM))+(b*$ (calibrating input light known value of $EX)+c$; and the second three dimensional plot provides the solution:

(second output)=$(d*$(calibrating input light known value of $FWXM))+(e*$ (calibrating input light known value of $EX)+f$; and the actual bandwidth calculation apparatus uses the derived equation:

(first actual bandwidth parameter)=$((b*$(second output))$-(e*$(first output))$+ce-bf)/(bd-ae)$, or the equation:

(second actual bandwidth parameter)=$((a*$(second output))$-(d*$(first output)) $+cd-af)/(ae-bd)$.

93. The apparatus of claim 87, further comprising:

the first three dimensional plot provides the solution:

(first output)=$(a*$(calibrating input light known value of $FWXM))+(b*$ (calibrating input light known value of $EX)+c$; and the second three dimensional plot provides the solution:

(second output)=$(d*$(calibrating input light known value of $FWXM))+(e*$ (calibrating input light known value of $EX)+f$; and the actual bandwidth calculation apparatus uses the derived equation:

(first actual bandwidth parameter)=$((b*$(second output))$-(e*$(first output))$+ce-bf)/(bd-ae)$, or the equation:

(second actual bandwidth parameter)=$((a*$(second output))$-(d*$(first output)) $+cd-af)/(ae-bd)$.

94. The apparatus of claim 88, further comprising:

the first three dimensional plot provides the solution:

(first output)=$(a*$(calibrating input light known value of $FWXM))+(b*$ (calibrating input light known value of $EX)+c$; and the second three dimensional plot provides the solution:

(second output)=$(d*$(calibrating input light known value of $FWXM))+(e*$ (calibrating input light known value of $EX)+f$; and the actual bandwidth calculation apparatus uses the derived equation:

(first actual bandwidth parameter)=$((b*$(second output))$-(e*$(first output))$+ce-bf)/(bd-ae)$, or the equation:

(second actual bandwidth parameter)=$((a*$(second output))$-(d*$(first output)) $+cd-af)/(ae-bd)$.

95. The apparatus of claim 89, further comprising:

the first three dimensional plot provides the solution:

(first output)=$(a*$(calibrating input light known value of $FWXM))+(b*$ (calibrating input light known value of $EX)+c$; and the second three dimensional plot provides the solution:

(second output)=$(d*$(calibrating input light known value of $FWXM))+(e*$ (calibrating input light known value of $EX)+f$; and the actual bandwidth calculation apparatus uses the derived equation:

(first actual bandwidth parameter)=$((b*$(second output))$-(e*$(first output))$+ce-bf)/(bd-ae)$, or the equation:

(second actual bandwidth parameter)=$((a*$(second output))$-(d*$(first output)) $+cd-af)/(ae-bd)$.

96. The apparatus of claim 90, further comprising:
the first three dimensional plot provides the solution:

(first output)=($a^*$(calibrating input light known value of FWXM))+($b^*$ (calibrating input light known value of EX)+$c$; and the second three dimensional plot provides the solution:

(second output)=($d^*$(calibrating input light known value of FWXM))+($e^*$ (calibrating input light known value of EX)+$f$; and the actual bandwidth calculation apparatus uses the derived equation:

(first actual bandwidth parameter)=(($b^*$(second output))−($e^*$(first output))+$ce−bf$)/($bd−ae$), or the equation:

(second actual bandwidth parameter)=(($a^*$(second output))−($d^*$(first output)) +$cd−af$)/($ae−bd$).

97. The apparatus of claim 91, further comprising:
the calibrating input light known value of FWXM is FWHM and the first actual bandwidth parameter is FWHM and the calibrating input light known value of EX is E95 and the second actual bandwidth parameter is E95.

98. The apparatus of claim 92, further comprising:
the calibrating input light known value of FWXM is FWHM and the first actual bandwidth parameter is FWHM and the calibrating input light known value of EX is E95 and the second actual bandwidth parameter is E95.

99. The apparatus of claim 93, further comprising:
the calibrating input light known value of FWXM is FWHM and the first actual bandwidth parameter is FWHM and the calibrating input light known value of EX is E95 and the second actual bandwidth parameter is E95.

100. The apparatus of claim 94, further comprising:
the calibrating input light known value of FWXM is FWHM and the first actual bandwidth parameter is FWHM and the calibrating input light known value of EX is E95 and the second actual bandwidth parameter is E95.

101. The apparatus of claim 95, further comprising:
the calibrating input light known value of FWXM is FWHM and the first actual bandwidth parameter is FWHM and the calibrating input light known value of EX is E95 and the second actual bandwidth parameter is E95.

102. The apparatus of claim 96, further comprising:
the calibrating input light known value of FWXM is FWHM and the first actual bandwidth parameter is FWHM and the calibrating input light known value of EX is E95 and the second actual bandwidth parameter is E95.

103. The apparatus of claim 97, further comprising:
the transfer function of the first optical bandwidth detector is selected to be much more sensitive to FWXM than to EX and the transfer function of the second optical bandwidth detector is selected to be much more sensitive to EX than to FWXM.

104. The apparatus of claim 98, further comprising:
the transfer function of the first optical bandwidth detector is selected to be much more sensitive to FWXM than to EX and the transfer function of the second optical bandwidth detector is selected to be much more sensitive to EX than to FWXM.

105. The apparatus of claim 99, further comprising:
the transfer function of the first optical bandwidth detector is selected to be much more sensitive to FWXM than to EX and the transfer function of the second optical bandwidth detector is selected to be much more sensitive to EX than to FWXM.

106. The apparatus of claim 100, further comprising:
the transfer function of the first optical bandwidth detector is selected to be much more sensitive to FWXM than to EX and the transfer function of the second optical bandwidth detector is selected to be much more sensitive to EX than to FWXM.

107. The apparatus of claim 101, further comprising:
the transfer function of the first optical bandwidth detector is selected to be much more sensitive to FWXM than to EX and the transfer function of the second optical bandwidth detector is selected to be much more sensitive to EX than to FWXM.

108. The apparatus of claim 102, further comprising:
the transfer function of the first optical bandwidth detector is selected to be much more sensitive to FWXM than to EX and the transfer function of the second optical bandwidth detector is selected to be much more sensitive to EX than to FWXM.

109. A bandwidth measuring means for measuring the bandwidth of a spectrum of light emitted from a laser input to the bandwidth measuring means comprising:
a first wavelength sensitive optical bandwidth detector means for providing a first output representative of a first parameter which is indicative of the bandwidth of the light emitted from the laser as actually measured by the first bandwidth detector means;
a second wavelength sensitive optical bandwidth detector means for providing a second output representative of a first parameter which is indicative of bandwidth of the light emitted from the laser as actually measured by the second bandwidth detector means; and,
an actual bandwidth calculation means for, utilizing the first output and the second output as part of a multi-variable linear equation employing precomputed calibration variables specific to either the first bandwidth detector means or the second bandwidth detector means, calculating a first actual bandwidth parameter or a second actual bandwidth parameter for the light emitted from the laser.

110. The apparatus of claim 109 further comprising:
the first actual bandwidth parameter is a FWXM of the spectrum of light emitted from the laser.

111. The apparatus of claim 109, further comprising:
the second actual bandwidth parameter is an EX the spectrum of light emitted from the laser.

112. The apparatus of claim 109 further comprising:
the first bandwidth detector means is an etalon and the first output is representative of a fringe width of a fringe of an optical output of the etalon at some percent of the maximum within the full width of the first output; and,
the second bandwidth detector means is an etalon and the second output is representative of a fringe width of an optical output of the etalon at some percent of the maximum within the full width of the second output.

113. The apparatus of claim 110 further comprising:
the first bandwidth detector means is an etalon and the first output representative of a fringe width of a fringe of an optical output of the etalon at some percent of the maximum within the full width of the first output; and, the second bandwidth detector means is an etalon and the second output is a fringe width of an optical output of the etalon at some percent of the maximum within the full width of the second output.

114. The apparatus of claim 111 further comprising:

the first bandwidth detector means is and etalon and the first output representative of a fringe width of a fringe of an optical output of the etalon at some percent of the maximum within the full width of the first output; and, the second bandwidth detector means is an etalon and the second output is a fringe width of an optical output of the etalon at some percent of the maximum within the full width of the second output.

115. The apparatus of claim 109, further comprising:

the precomputed calibration variables are derived from a three dimensional plot representing the first output of the first bandwidth detector means in relation to a calibrating input light with known values of the first actual bandwidth parameter and of the second actual bandwidth parameter, and from a three dimensional plot representing the second output of the second bandwidth detector means in relation to a calibrating input light with known values of the first actual bandwidth parameter and of the second actual bandwidth parameter.

116. The apparatus of claim 110, further comprising:

the precomputed calibration variables are derived from a three dimensional plot representing the first output of the first bandwidth detector means in relation to a calibrating input light with known values of the first actual bandwidth parameter and of the second actual bandwidth parameter, and from a three dimensional plot representing the second output of the second bandwidth detector means in relation to a calibrating input light with known values of the first actual bandwidth parameter and of the second actual bandwidth parameter.

117. The apparatus of claim 111, further comprising:

the precomputed calibration variables are derived from a three dimensional plot representing the first output of the first bandwidth detector means in relation to a calibrating input light with known values of the first actual bandwidth parameter and of the second actual bandwidth parameter, and from a three dimensional plot representing the second output of the second bandwidth detector means in relation to a calibrating input light with known values of the first actual bandwidth parameter and of the second actual bandwidth parameter.

118. The apparatus of claim 112, further comprising:

the precomputed calibration variables are derived from a three dimensional plot representing the first output of the first bandwidth detector means in relation to a calibrating input light with known values of the first actual bandwidth parameter and of the second actual bandwidth parameter, and from a three dimensional plot representing the second output of the second bandwidth detector means in relation to a calibrating input light with known values of the first actual bandwidth parameter and of the second actual bandwidth parameter.

119. The apparatus of claim 113, further comprising:

the precomputed calibration variables are derived from a three dimensional plot representing the first output of the first bandwidth detector means in relation to a calibrating input light with known values of the first actual bandwidth parameter and of the second actual bandwidth parameter, and from a three dimensional plot representing the second output of the second bandwidth detector means in relation to a calibrating input light with known values of the first actual bandwidth parameter and of the second actual bandwidth parameter.

120. The apparatus of claim 114, further comprising:

the precomputed calibration variables are derived from a three dimensional plot representing the first output of the first bandwidth detector means in relation to a calibrating input light with known values of the first actual bandwidth parameter and of the second actual bandwidth parameter, and from a three dimensional plot representing the second output of the second bandwidth detector means in relation to a calibrating input light with known values of the first actual bandwidth parameter and of the second actual bandwidth parameter.

121. The apparatus of claim 115, further comprising:

the first actual bandwidth parameter is an FWXM of the spectrum of light emitted from the laser; and, the second actual bandwidth parameter is an EX of the spectrum of light emitted from the laser.

122. The apparatus of claim 116, further comprising:

the first actual bandwidth parameter is an FWXM of the spectrum of light emitted from the laser; and, the second actual bandwidth parameter is an EX of the spectrum of light emitted from the laser.

123. The apparatus of claim 117, further comprising:

the first actual bandwidth parameter is an FWXM of the spectrum of light emitted from the laser; and, the second actual bandwidth parameter is an EX of the spectrum of light emitted from the laser.

124. The apparatus of claim 118, further comprising:

the first actual bandwidth parameter is an FWXM of the spectrum of light emitted from the laser; and, the second actual bandwidth parameter is an EX of the spectrum of light emitted from the laser.

125. The apparatus of claim 119, further comprising:

the first actual bandwidth parameter is an FWXM of the spectrum of light emitted from the laser; and, the second actual bandwidth parameter is an EX of the spectrum of light emitted from the laser.

126. The apparatus of claim 120, further comprising:

the first actual bandwidth parameter is an FWXM of the spectrum of light emitted from the laser; and, the second actual bandwidth parameter is an EX of the spectrum of light emitted from the laser.

127. The apparatus of claim 121, further comprising:

the first three dimensional plot provides the solution:

(first output)=$(a*$(calibrating input light known value of $FWXM$ of the spectrum))+$(b*$(calibrating input light known value of $EX$ of the spectrum)+$c$; and the second three dimensional plot provides the solution:

(second output)=$(d*$(calibrating input light known value of $FWXM$ of the spectrum))+$(e*$(calibrating input light known value of $EX$ of the spectrum)+$f$; and the actual bandwidth calculation apparatus uses the derived equation:

(first actual bandwidth parameter)=(($b$*(second output))−($e$*(first output))+$ce-bf$)/($bd-ae$), or the equation:

(second actual bandwidth parameter)=(($a$*(second output))−($d$*(first output))+$cd-af$)/($ae-bd$).

128. The apparatus of claim 122, further comprising:

the first three dimensional plot provides the solution:

(first output)=($a$*(calibrating input light known value of *FWXM* of the spectrum))+($b$*(calibrating input light known value of *EX* of the spectrum)+$c$;and the second three dimensional plot provides the solution:

(second output)=($d$*(calibrating input light known value of *FWXM* of the spectrum))+($e$* (calibrating input light known value of *EX* of the spectrum)+$f$; and the actual bandwidth calculation apparatus uses the derived equation:

(first actual bandwidth parameter)=(($b$*(second output))−($e$*(first output))+$ce-bf$)/($bd-ae$), or the equation:

(second actual bandwidth parameter)=(($a$*(second output))−($d$*(first output))+$cd-af$)/($ae-bd$).

129. The apparatus of claim 123, further comprising:

the first three dimensional plot provides the solution:

(first output)=($a$*(calibrating input light known value of *FWXM* of the spectrum))+($b$*(calibrating input light known value of *EX* of the spectrum)+$c$; and the second three dimensional plot provides the solution:

(second output)=($d$*(calibrating input light known value of *FWXM* of the spectrum))+($e$*(calibrating input light known value of *EX* of the spectrum)+$f$; and the actual bandwidth calculation apparatus uses the derived equation:

(first actual bandwidth parameter)=(($b$*(second output))−($e$*(first output))+$ce-bf$)/($bd-ae$), or the equation:

(second actual bandwidth parameter)=(($a$*(second output))−($d$*(first output))+$cd-af$)/($ae-bd$).

130. The apparatus of claim 124, further comprising:

the first three dimensional plot provides the solution:

(first output)=($a$*(calibrating input light known value of *FWXM* of the spectrum))+($b$*(calibrating input light known value of *EX* of the spectrum)+$c$; and the second three dimensional plot provides the solution:

(second output)=($d$*(calibrating input light known value of *FWXM* of the spectrum))+($e$*(calibrating input light known value of *EX* of the spectrum)+$f$; and the actual bandwidth calculation apparatus uses the derived equation:

(first actual bandwidth parameter)=(($b$*(second output))−($e$*(first output))+$ce-bf$)/($bd-ae$), or the equation:

(second actual bandwidth parameter)=(($a$*(second output))−($d$*(first output))+$cd-af$)/($ae-bd$).

131. The apparatus of claim 125, further comprising:

the first three dimensional plot provides the solution:

(first output)=($a$*(calibrating input light known value of *FWXM* of the spectrum))+($b$*(calibrating input light known value of *EX* of the spectrum)+$c$; and the second three dimensional plot provides the solution:

(second output)=($d$*(calibrating input light known value of *FWXM* of the spectrum))+($e$*(calibrating input light known value of *EX* of the spectrum)+$f$; and the actual bandwidth calculation apparatus uses the derived equation:

(first actual bandwidth parameter)=(($b$*(second output))−($e$*(first output))+$ce-bf$)/($bd-ae$), or the equation:

(second actual bandwidth parameter)=(($a$*(second output))−($d$*(first output))+$cd-af$)/($ae-bd$).

132. The apparatus of claim 126, further comprising:

the first three dimensional plot provides the solution:

(first output)=($a$*(calibrating input light known value of *FWXM* of the spectrum))+($b$*(calibrating input light known value of *EX* of the spectrum)+$c$; and the second three dimensional plot provides the solution:

(second output)=($d$*(calibrating input light known value of *FWXM* of the spectrum))+($e$*(calibrating input light known value of *EX* of the spectrum)+$f$; and the actual bandwidth calculation apparatus uses the derived equation:

(first actual bandwidth parameter)=(($b$*(second output))−($e$*(first output))+$ce-bf$)/($bd-ae$), or the equation:

(second actual bandwidth parameter)=(($a$*(second output))−($d$*(first output))+$cd-af$)/($ae-bd$).

133. The apparatus of claim 127, further comprising:

the calibrating input light known value of FWXM is FWHM and the first actual bandwidth parameter is FWHM and the calibrating input light known value of EX is E95 and the second actual bandwidth parameter is E95.

134. The apparatus of claim 128, further comprising:

the calibrating input light known value of FWXM is FWHM and the first actual bandwidth parameter is FWHM and the calibrating input light known value of EX is E95 and the second actual bandwidth parameter is E95.

135. The apparatus of claim 129, further comprising:
the calibrating input light known value of FWXM is FWHM and the first actual bandwidth parameter is FWHM and the calibrating input light known value of EX is E95 and the second actual bandwidth parameter is E95.

136. The apparatus of claim 130, further comprising:
the calibrating input light known value of FWXM is FWHM and the first actual bandwidth parameter is FWHM and the calibrating input light known value of EX is E95 and the second actual bandwidth parameter is E95.

137. The apparatus of claim 131, further comprising:
the calibrating input light known value of FWXM is FWHM and the first actual bandwidth parameter is FWHM and the calibrating input light known value of EX is E95 and the second actual bandwidth parameter is E95.

138. The apparatus of claim 132, further comprising:
the calibrating input light known value of FWXM is FWHM and the first actual bandwidth parameter is FWI-IM and the calibrating input light known value of EX is E95 and the second actual bandwidth parameter is E95.

139. The apparatus of claim 133, further comprising:
the transfer function of the first optical bandwidth detector is selected to be much more sensitive to the full width at some percent of maximum than to the content of the spectrum containing some percentage of the energy of the full spectrum and the transfer function of the second optical bandwidth detector is selected to be much more sensitive to the content of the spectrum containing some percentage of the energy of the full spectrum than to the full width at some percent of maximum.

140. The apparatus of claim 134, further comprising:
the transfer function of the first optical bandwidth detector is selected to be much more sensitive to the full width at some percent of maximum than to the content of the spectrum containing some percentage of the energy of the full spectrum and the transfer function of the second optical bandwidth detector is selected to be much more sensitive to the content of the spectrum containing some percentage of the energy of the full spectrum than to the full width at some percent of maximum.

141. The apparatus of claim 135, further comprising:
the transfer function of the first optical bandwidth detector is selected to be much more sensitive to the full width at some percent of maximum than to the content of the spectrum containing some percentage of the energy of the full spectrum and the transfer function of the second optical bandwidth detector is selected to be much more sensitive to the content of the spectrum containing some percentage of the energy of the full spectrum than to the full width at some percent of maximum.

142. The apparatus of claim 136, further comprising:
the transfer function of the first optical bandwidth detector is selected to be much more sensitive to the full width at some percent of maximum than to the content of the spectrum containing some percentage of the energy of the full spectrum and the transfer function of the second optical bandwidth detector is selected to be much more sensitive to the content of the spectrum containing some percentage of the energy of the full spectrum than to the full width at some percent of maximum.

143. The apparatus of claim 137, further comprising:
the transfer function of the first optical bandwidth detector is selected to be much more sensitive to the full width at some percent of maximum than to the content of the spectrum containing some percentage of the energy of the full spectrum and the transfer function of the second optical bandwidth detector is selected to be much more sensitive to the content of the spectrum containing some percentage of the energy of the full spectrum than to the full width at some percent of maximum.

144. The apparatus of claim 138, further comprising:
the transfer function of the first optical bandwidth detector is selected to be much more sensitive to the full width at some percent of maximum than to the content of the spectrum containing some percentage of the energy of the full spectrum and the transfer function of the second optical bandwidth detector is selected to be much more sensitive to the content of the spectrum containing some percentage of the energy of the full spectrum than to the full width at some percent of maximum.

145. A bandwidth measuring method for measuring the bandwidth of a spectrum of light emitted from a laser comprising:
utilizing a first wavelength sensitive optical bandwidth detector to provide a first output representative of a first parameter which is indicative of the bandwidth of the light emitted from the laser as actually measured by the first bandwidth detector;
utilizing a second wavelength sensitive optical bandwidth detector to provide a second output representative of a first parameter which is indicative of bandwidth of the light emitted from the laser as actually measured by the second bandwidth detector; and,
utilizing an actual bandwidth calculation device, utilizing the first output and the second output as part of a multivariable linear equation employing precomputed calibration variables specific to either the first bandwidth detector or the second bandwidth detector, to calculate a first actual bandwidth parameter or a second actual bandwidth parameter for the light emitted from the laser.

146. The method of claim 145 further comprising:
the first actual bandwidth parameter is a FWXM of the spectrum of light emitted from the laser.

147. The method of claim 145, further comprising:
the second actual bandwidth parameter is an EX the spectrum of light emitted from the laser.

148. The method of claim 145 further comprising:
the first bandwidth detector means is an etalon and the first output is representative of a fringe width of a fringe of an optical output of the etalon at some percent of the maximum within the full width of the first output; and,
the second bandwidth detector means is an etalon and the second output is representative of a fringe width of an optical output of the etalon at some percent of the maximum within the full width of the second output.

149. The method of claim 146 further comprising:
the first bandwidth detector means is an etalon and the first output representative of a fringe width of a fringe of an optical output of the etalon at some percent of the maximum within the full width of the first output; and,
the second bandwidth detector means is an etalon and the second output is a fringe width of an optical output of the etalon at some percent of the maximum within the full width of the second output.

150. The method of claim 147 further comprising:
the first bandwidth detector means is and etalon and the first output representative of a fringe width of a fringe of an optical output of the etalon at some percent of the maximum within the full width of the first output; and, the second bandwidth detector means is an etalon and the second output is a fringe width of an optical output of the etalon at some percent of the maximum within the full width of the second output.

151. The method of claim 145, further comprising:

deriving the precomputed calibration variables from a three dimensional plot representing the first output of the first bandwidth detector means in relation to a calibrating input light with known values of the first actual bandwidth parameter and of the second actual bandwidth parameter, and from a three dimensional plot representing the second output of the second bandwidth detector means in relation to a calibrating input light with known values of the first actual bandwidth parameter and of the second actual bandwidth parameter.

152. The method of claim 146, further comprising:

deriving the precomputed calibration variables from a three dimensional plot representing the first output of the first bandwidth detector means in relation to a calibrating input light with known values of the first actual bandwidth parameter and of the second actual bandwidth parameter, and from a three dimensional plot representing the second output of the second bandwidth detector means in relation to a calibrating input light with known values of the first actual bandwidth parameter and of the second actual bandwidth parameter.

153. The method of claim 147, further comprising:

deriving the precomputed calibration variables from a three dimensional plot representing the first output of the first bandwidth detector means in relation to a calibrating input light with known values of the first actual bandwidth parameter and of the second actual bandwidth parameter, and from a three dimensional plot representing the second output of the second bandwidth detector means in relation to a calibrating input light with known values of the first actual bandwidth parameter and of the second actual bandwidth parameter.

154. The method of claim 112, further comprising:

deriving the precomputed calibration variables from a three dimensional plot representing the first output of the first bandwidth detector means in relation to a calibrating input light with known values of the first actual bandwidth parameter and of the second actual bandwidth parameter, and from a three dimensional plot representing the second output of the second bandwidth detector means in relation to a calibrating input light with known values of the first actual bandwidth parameter and of the second actual bandwidth parameter.

155. The method of claim 149, further comprising:

deriving the precomputed calibration variables from a three dimensional plot representing the first output of the first bandwidth detector means in relation to a calibrating input light with known values of the first actual bandwidth parameter and of the second actual bandwidth parameter, and from a three dimensional plot representing the second output of the second bandwidth detector means in relation to a calibrating input light with known values of the first actual bandwidth parameter and of the second actual bandwidth parameter.

156. The method of claim 150, further comprising:

deriving the precomputed calibration variables from a three dimensional plot representing the first output of the first bandwidth detector means in relation to a calibrating input light with known values of the first actual bandwidth parameter and of the second actual bandwidth parameter, and from a three dimensional plot representing the second output of the second bandwidth detector means in relation to a calibrating input light with known values of the first actual bandwidth parameter and of the second actual bandwidth parameter.

157. The method of claim 151, further comprising:

the first actual bandwidth parameter is an FWXM of the spectrum of light emitted from the laser; and, the second actual bandwidth parameter is an EX of the spectrum of light emitted from the laser.

158. The method of claim 152, further comprising:

the first actual bandwidth parameter is an FWXM of the spectrum of light emitted from the laser; and, the second actual bandwidth parameter is an EX of the spectrum of light emitted from the laser.

159. The method of claim 153, further comprising:

the first actual bandwidth parameter is an FWXM of the spectrum of light emitted from the laser; and, the second actual bandwidth parameter is an EX of the spectrum of light emitted from the laser.

160. The method of claim 154, further comprising:

the first actual bandwidth parameter is an FWXM of the spectrum of light emitted from the laser; and, the second actual bandwidth parameter is an EX of the spectrum of light emitted from the laser.

161. The method of claim 155, further comprising:

the first actual bandwidth parameter is an FWXM of the spectrum of light emitted from the laser; and, the second actual bandwidth parameter is an EX of the spectrum of light emitted from the laser.

162. The method of claim 156, further comprising:

the first actual bandwidth parameter is an FWXM of the spectrum of light emitted from the laser; and, the second actual bandwidth parameter is an EX of the spectrum of light emitted from the laser.

163. The method of claim 157, further comprising:

the first three dimensional plot provides the solution:

$$\text{(first output)} = (a^*(\text{calibrating input light known value of } FWXM \text{ of the spectrum})) + (b^*(\text{calibrating input light known value of } EX \text{ of the spectrum}) + c; \text{ and}$$

the second three dimensional plot provides the solution:

$$\text{(second output)} = (d^*(\text{calibrating input light known value of } FWXM \text{ of the spectrum})) + (e^*(\text{calibrating input light known value of } EX \text{ of the spectrum}) + f; \text{ and}$$

the actual bandwidth calculation apparatus uses the derived equation:

$$\text{(first actual bandwidth parameter)} = ((b^*(\text{second output})) - (e^*(\text{first output})) + ce - bf)/(bd - ae),$$

or the equation:

$$\text{(second actual bandwidth parameter)} = ((a^*(\text{second output})) - (d^*(\text{first output})) + cd - af)/(ae - bd).$$

164. The method of claim 158, further comprising:
the first three dimensional plot provides the solution:

(first output)=($a*$(calibrating input light known value of $FWXM$ of the spectrum))+($b*$(calibrating input light known value of $EX$ of the spectrum)+$c$; and the second three dimensional plot provides the solution:

(second output)=($d*$(calibrating input light known value of $FWXM$ of the spectrum))+($e*$(calibrating input light known value of $EX$ of the spectrum)+$f$; and the actual bandwidth calculation apparatus uses the derived equation:

(first actual bandwidth parameter)=(($b*$(second output))−($e*$(first output))+$ce$−$bf$)/($bd$−$ae$), or the equation:

(second actual bandwidth parameter)=(($a*$(second output))−($d*$(first output))+$cd$−$af$)/($ae$−$bd$).

165. The method of claim 159, further comprising:
the first three dimensional plot provides the solution:

(first output)=($a*$(calibrating input light known value of $FWXM$ of the spectrum))+($b*$(calibrating input light known value of $EX$ of the spectrum)+$c$; and the second three dimensional plot provides the solution:

(second output)=($d*$(calibrating input light known value of $FWXM$ of the spectrum))+($e*$(calibrating input light known value of $EX$ of the spectrum)+$f$; and the actual bandwidth calculation apparatus uses the derived equation:

(first actual bandwidth parameter)=(($b*$(second output))−($e*$(first output))+$ce$−$bf$)/($bd$−$ae$), or the equation:

(second actual bandwidth parameter)=(($a*$(second output))−($d*$(first output))+$cd$−$af$)/($ae$−$bd$).

166. The method of claim 160, further comprising:
the first three dimensional plot provides the solution:

(first output)=($a*$(calibrating input light known value of $FWXM$ of the spectrum))+($b*$(calibrating input light known value of $EX$ of the spectrum)+$c$; and the second three dimensional plot provides the solution:

(second output)=($d*$(calibrating input light known value of $FWXM$ of the spectrum))+($e*$(calibrating input light known value of $EX$ of the spectrum)+$f$; and the actual bandwidth calculation apparatus uses the derived equation:

(first actual bandwidth parameter)=(($b*$(second output))−($e*$(first output))+$ce$−$bf$)/($bd$−$ae$), or the equation:

(second actual bandwidth parameter)=(($a*$(second output))−($d*$(first output))+$cd$−$af$)/($ae$−$bd$).

167. The method of claim 161, further comprising:
the first three dimensional plot provides the solution:

(first output)=($a*$(calibrating input light known value of $FWXM$ of the spectrum))+($b*$(calibrating input light known value of $EX$ of the spectrum)+$c$; and the second three dimensional plot provides the solution:

(second output)=($d*$(calibrating input light known value of $FWXM$ of the spectrum))+($e*$(calibrating input light known value of $EX$ of the spectrum)+$f$; and the actual bandwidth calculation apparatus uses the derived equation:

(first actual bandwidth parameter)=(($b*$(second output))−($e*$(first output))+$ce$−$bf$)/($bd$−$ae$), or the equation:

(second actual bandwidth parameter)=(($a*$(second output))−($d*$(first output))+$cd$−$af$)/($ae$−$bd$).

168. The method of claim 162, further comprising:
the first three dimensional plot provides the solution:

(first output)=($a*$(calibrating input light known value of $FWXM$ of the spectrum))+($b*$(calibrating input light known value of $EX$ of the spectrum)+$c$; and the second three dimensional plot provides the solution:

(second output)=($d*$(calibrating input light known value of $FWXM$ of the spectrum))+($e*$(calibrating input light known value of $EX$ of the spectrum)+$f$; and the actual bandwidth calculation apparatus uses the derived equation:

(first actual bandwidth parameter)=(($b*$(second output))−($e*$(first output))+$ce$−$bf$)/($bd$−$ae$), or the equation:

(second actual bandwidth parameter)=(($a*$(second output))−($d*$(first output))+$cd$−$af$)/($ae$−$bd$).

169. The method of claim 163, further comprising:
the calibrating input light known value of FWXM is FWHM and the first actual bandwidth parameter is FWHM and the calibrating input light known value of EX is E95 and the second actual bandwidth parameter is E95.

170. The method of claim 164, further comprising:
the calibrating input light known value of FWXM is FWHM and the first actual bandwidth parameter is FWHM and the calibrating input light known value of EX is E95 and the second actual bandwidth parameter is E95.

171. The method of claim 165, further comprising:
the calibrating input light known value of FWXM is FWHM and the first actual bandwidth parameter is FWHM and the calibrating input light known value of EX is E95 and the second actual bandwidth parameter is E95.

172. The method of claim 166, further comprising:
the calibrating input light known value of FWXM is FWHM and the first actual bandwidth parameter is FWHM and the calibrating input light known value of EX is E95 and the second actual bandwidth parameter is E95.

173. The method of claim 167, further comprising:

the calibrating input light known value of FWXM is FWHM and the first actual bandwidth parameter is FWHM and the calibrating input light known value of EX is E95 and the second actual bandwidth parameter is E95.

174. The method of claim 168, further comprising:

the calibrating input light known value of FWXM is FWHM and the first actual bandwidth parameter is FWHM and the calibrating input light known value of EX is E95 and the second actual bandwidth parameter is E95.

175. The method of claim 169, further comprising:

the transfer function of the first optical bandwidth detector is selected to be much more sensitive to the full width at some percent of maximum than to the content of the spectrum containing some percentage of the energy of the full spectrum and the transfer function of the second optical bandwidth detector is selected to be much more sensitive to the content of the spectrum containing some percentage of the energy of the full spectrum than to the full width at some percent of maximum.

176. The method of claim 170, further comprising:

the transfer function of the first optical bandwidth detector is selected to be much more sensitive to the full width at some percent of maximum than to the content of the spectrum containing some percentage of the energy of the full spectrum and the transfer function of the second optical bandwidth detector is selected to be much more sensitive to the content of the spectrum containing some percentage of the energy of the full spectrum than to the full width at some percent of maximum.

177. The method of claim 171, further comprising:

the transfer function of the first optical bandwidth detector is selected to be much more sensitive to the full width at some percent of maximum than to the content of the spectrum containing some percentage of the energy of the full spectrum and the transfer function of the second optical bandwidth detector is selected to be much more sensitive to the content of the spectrum containing some percentage of the energy of the full spectrum than to the full width at some percent of maximum.

178. The method of claim 172, further comprising:

the transfer function of the first optical bandwidth detector is selected to be much more sensitive to the full width at some percent of maximum than to the content of the spectrum containing some percentage of the energy of the full spectrum and the transfer function of the second optical bandwidth detector is selected to be much more sensitive to the content of the spectrum containing some percentage of the energy of the full spectrum than to the full width at some percent of maximum.

179. The method of claim 173, further comprising:

the transfer function of the first optical bandwidth detector is selected to be much more sensitive to the full width at some percent of maximum than to the content of the spectrum containing some percentage of the energy of the full spectrum and the transfer function of the second optical bandwidth detector is selected to be much more sensitive to the content of the spectrum containing some percentage of the energy of the full spectrum than to the full width at some percent of maximum.

180. The method of claim 174, further comprising:

the transfer function of the first optical bandwidth detector is selected to be much more sensitive to the full width at some percent of maximum than to the content of the spectrum containing some percentage of the energy of the full spectrum and the transfer function of the second optical bandwidth detector is selected to be much more sensitive to the content of the spectrum containing some percentage of the energy of the full spectrum than to the full width at some percent of maximum.

* * * * *

UNITED STATES PATENT AND TRADEMARK OFFICE
CERTIFICATE OF CORRECTION

PATENT NO. : 6,952,267 B2  
APPLICATION NO. : 10/615321  
DATED : October 4, 2005  
INVENTOR(S) : Robert J. Rafac Page 1 of 1

It is certified that error appears in the above-identified patent and that said Letters Patent is hereby corrected as shown below:

Title Page  
Item (12) "Rarac" should be changed to --Rafac--.  
Item (75) "Rarac" should be changed to --Rafac--.

Signed and Sealed this

Third Day of June, 2008

JON W. DUDAS  
*Director of the United States Patent and Trademark Office*